(12) United States Patent
Matsumura et al.

(10) Patent No.: US 7,485,401 B2
(45) Date of Patent: Feb. 3, 2009

(54) RESIN COMPOSITION FOR TONER, AND TONERS

(75) Inventors: Kenichi Matsumura, Koka-gun (JP); Akihiro Niki, Minato-ku (JP); Takashi Shinjo, Mishima-gun (JP); Hideyuki Takahashi, Mishima-gun (JP)

(73) Assignee: Mitsui Chemicals, Inc., Tokyo (JP)

( * ) Notice: Subject to any disclaimer, the term of this patent is extended or adjusted under 35 U.S.C. 154(b) by 347 days.

(21) Appl. No.: 10/523,072

(22) PCT Filed: Jul. 30, 2003

(86) PCT No.: PCT/JP03/09628

§ 371 (c)(1),
(2), (4) Date: Apr. 26, 2005

(87) PCT Pub. No.: WO2004/025372

PCT Pub. Date: Mar. 25, 2004

(65) Prior Publication Data

US 2005/0245694 A1    Nov. 3, 2005

(30) Foreign Application Priority Data

| Jul. 30, 2002 | (JP) | 2002-221563 |
| Oct. 11, 2002 | (JP) | 2002-299667 |
| Oct. 11, 2002 | (JP) | 2002-299669 |
| Oct. 11, 2002 | (JP) | 2002-299671 |
| Oct. 11, 2002 | (JP) | 2002-299673 |
| Oct. 11, 2002 | (JP) | 2002-299674 |
| Nov. 15, 2002 | (JP) | 2002-332727 |
| Jun. 9, 2003 | (JP) | 2003-164151 |
| Jun. 9, 2003 | (JP) | 2003-164152 |
| Jun. 9, 2003 | (JP) | 2003-164153 |
| Jun. 9, 2003 | (JP) | 2003-164154 |

(51) Int. Cl.
G03G 9/087    (2006.01)

(52) U.S. Cl. .................. 430/109.4; 525/437

(58) Field of Classification Search .............. 430/109.4; 521/182; 525/437
See application file for complete search history.

(56) References Cited

U.S. PATENT DOCUMENTS

| 4,385,107 | A | * | 5/1983 | Tanaka et al. .......... 430/124.23 |
| 4,797,340 | A | * | 1/1989 | Tanaka et al. ............ 430/109.3 |
| 5,234,788 | A | | 8/1993 | Morimoto et al. |
| 6,080,519 | A | | 6/2000 | Ishiyama et al. |
| 6,106,986 | A | | 8/2000 | Shirai et al. |
| 6,383,705 | B2 | | 5/2002 | Aoki et al. |
| 2003/0008225 | A1 | * | 1/2003 | Emura et al. ............. 430/109.4 |
| 2003/0180645 | A1 | * | 9/2003 | Tavernier et al. ......... 430/109.4 |
| 2004/0185355 | A1 | * | 9/2004 | Sato et al. ..................... 430/45 |

FOREIGN PATENT DOCUMENTS

| JP | 56-65146 | 6/1981 |
| JP | 62-039428 | 6/1981 |
| JP | 63-108358 | 5/1988 |
| JP | 4-97366 | 3/1992 |
| JP | 4-313760 | 11/1992 |
| JP | 4-337741 | 11/1992 |
| JP | 5-44032 | 7/1993 |
| JP | 5-165252 | 7/1993 |
| JP | 7-301951 | 11/1995 |
| JP | 9-258484 | 10/1997 |
| JP | 2704282 | 10/1997 |
| JP | 10-36490 | 2/1998 |
| JP | 10-90938 | 4/1998 |
| JP | 2988703 | 10/1999 |
| JP | 2000-81721 | 3/2000 |
| JP | 2000-214638 A | 8/2000 |
| JP | 2000-250264 A | 9/2000 |
| JP | 2001-222138 A | 8/2001 |
| JP | 2001-305788 | 11/2001 |
| JP | 2001-312093 A | 11/2001 |

* cited by examiner

Primary Examiner—Christopher RoDee
Assistant Examiner—Peter L Vajda
(74) Attorney, Agent, or Firm—Sughrue Mion, PLLC

(57) ABSTRACT

It is an object of the present invention to provide a resin composition for a toner and a toner excellent in low temperature fixation property, high temperature offset resistance, blocking resistance, and excellent in coloration.

The present invention relates to a resin composition for a toner, which contains a crystalline polymer having a melting point of 180 to 280° C. and heat absorption of 25 to 150 mJ/mg at a melting point measured by a differential scanning calorimeter (DSC) and a non-crystalline polyester having a glass transition temperature of 30 to 80° C.

24 Claims, No Drawings

RESIN COMPOSITION FOR TONER, AND TONERS

TECHNICAL FIELD

The invention relates to a resin composition for a toner and a toner excellent in low temperature fixation, a high temperature offset resistance, blocking resistance, and excellent in coloration.

BACKGROUND ART

As a method of developing an electrostatic image in electrophotography, various dry development methods have been employed. In such dry development methods, generally a toner is charged by friction with an iron powder, glass beads called as a carrier and electrically attracted and adhered to a photo conductor in an electrostatic latent image and transferred to paper and fixed by a heating roller to give a permanently visible image.

A widely employed method as a fixing method is a heating roller method involving passing a toner image of an object sheet to carry a toner image thereon through the surface of a thermal fixing roller having the surface made of a separable material to a toner in a pressuring and contacting state.

In this thermally fixing roller method, to improve the economic property such as saving power consumption and increase the copying speed, a toner fixable at lower temperature has been desired.

However, if the above-mentioned low temperature fixation property is to be improved, an offset phenomenon that a portion of the toner adheres to the thermal fixing roller surface and re-transferred to paper tends to occur easily or a blocking phenomenon that the toner coagulation is caused by heat which the resin particles receive in various ambient environments tends to occur easily.

With respect to a conventional polyester type toner, chemical crosslinking structure is formed in the polymer by copolymerization of the polyfunctional, generally tri- or higher-functional monomers to retain high temperature offset resistant property. However, such a method is inferior in luster owing to the unevenness of the printed surface caused by the fixing roll after fixation owing to the existence of components which are not dissolved in the polymer or has a limit in the low temperature fixation property.

To deal with such problems, Japanese Patent No. 2,988,703 proposes use of crystalline polyester resin containing 50% or more by mole of repeating units obtained from terephthalic acid and straight chain type alkylene glycol having 2 to 6 carbon atoms in the total monomer units used as a binder resin for a toner. However, according to the technique proposed, only the crystalline polyester resin is used, the temperature range for possible fixation is narrow and thus it is difficult to keep the high temperature offset resistance and blocking resistance without deteriorating the low temperature fixation property.

Japanese Patent No. 2,704,282 proposes use of non-crystalline polyester resin obtained by polymerization of polyvalent monomers with tri- or higher-valence, aromatic dicarboxylic acids, and aliphatic alcohol containing 50% or more by mole of branched aliphatic alcohol as a binder resin for a toner. However, there are problems that the low temperature fixation property is insufficient because of sole use of non-crystalline polyester resin.

Japanese Kokai Publication Hei-4-97366 and 4-313760 propose toners containing two types of polyesters with different softening points for toner resins, as toners excellent in the balance between the low temperature fixation property and the high temperature offset resistance. However, the compatibility of these two type polyesters is not so sufficient to tend to cause blocking of the polyester with a low softening point or filming because of adhesion of the polyester to the fixing roller and further, since the compatibility is insufficient, the transparency of the resin is low.

Japanese Kokoku Publication Hei-5-44032 proposes use of block copolymers of low melting point crystalline polyesters and high melting point crystalline polyesters as binder resin for a toner. However, there is a problem that according to this technique, the binder resin becomes an opaque whitish resin and no transparent resin can be obtained.

Further, if the toner is exposed to a temperature equal to or higher than the glass transition temperature of the resin for the toner, blocking phenomenon is caused easily and therefore, possibility of using polyester resin for a toner which scarcely causes the blocking phenomenon has been investigated. As polyester resin for a toner which scarcely causes the blocking phenomenon although having not so low temperature for low temperature fixation, Japanese Kokai Publication Hei-4-337741 describes that it is effective to use polyester resin compositions with specified compositions and also Japanese Kokai Publication Hei-10-36490 describes that it is effective to use polyester resin with specified compositions and having glass transition temperature in a range of 45 to 70° C. However, although the blocking phenomenon is suppressed at a normal temperature by these techniques, even in the case of using such resins for a toner, blocking phenomenon is caused any way if toners are exposed to a temperature around the glass transition temperature of the resins for a toner.

Japanese Kokai Publication Sho-56-65146 discloses a toner for electrophotography comprising a binder composed of 50 to 95% by weight of an non-crystalline polyester with a glass transition temperature 40° or higher, a softening point of 80 to 150° C. and a number average molecular weight 1,000 to 10,000 and 5 to 50% by weight of crystalline polyester with a glass transition temperature 0° C. or higher, a melting point 110 to 220° C., and a number average molecular weight 8,000 to 40,000. The toner is improved in the fine pulverization property, blocking resistance, and the property of separation to a heating roller by use of two types of polyesters as a binder. However, it is difficult to sufficiently satisfy the low temperature fixation property, high temperature offset resistance, and storage stability only by simply mixing and using two types of polyesters and hard to provide sufficient durability and image reproducibility.

SUMMARY OF THE INVENTION

In view of the above state of the art, it is an object of the invention to provide a resin composition for a toner and a toner excellent in low temperature fixation property, high temperature offset resistance, blocking resistance, and excellent in coloration.

The invention provides a resin composition for a toner, which contains a crystalline polymer having a melting point of 180 to 280° C. and heat absorption of 25 to 150 mJ/mg at a melting point measured by a differential scanning calorimeter (DSC) and a non-crystalline polyester having a glass transition temperature of 30 to 80° C.

The resin composition for a toner of the invention is preferable to have heat absorption of 1 to 20 mJ/mg at a melting point measured by a differential scanning calorimeter (DSC) and 5 μm or smaller average particle diameter of crystalline particles observed by a polarizing microscope, and a haze value of 60% or higher measured by a method according to JIS K 7105.

The resin composition for a toner of the invention is preferable to have 30° C. or less difference of the recrystallization initiating temperature Tic and the recrystallization peak temperature Tpc measured by a differential scanning calorimeter (DSC) and 80° C. or higher recrystallization initiating temperature Tic.

The resin composition for a toner of the invention is, when 5% shear strain is applied at 190° C., preferable to have 15 to 90 change rate D of the relaxation modulus defined by the following equation (1):

$$D = (1 - G_{5\%}(0.1)/G_{5\%\,max}) \times 100 \quad (1)$$

in the formula, $G_{5\%}(0.1)$ represents the relaxation modulus after 0.1 second from 5% shear strain application and $G_{5\%\,max}$ represents the relaxation modulus at the peak point of the relaxation modulus curve.

The resin composition for a toner of the invention is, when 450% shear strain is applied at 190° C., preferable to have −27 or higher slope K of the relaxation modulus curve observed after 0.02 seconds to 0.1 seconds from the moment of the shear strain application defined by the following formula (2):

$$K = \{(\mathrm{Log}(G(0.1)) - \mathrm{Log}(G(0.02)))\}/(0.1 - 0.02) \quad (2)$$

in the formula, G(0.02) represents the relaxation modulus after 0.02 seconds from the shear strain application and G(0.1) represents the relaxation modulus after 0.1 seconds from the shear strain application. The above-mentioned relaxation modulus G(0.1) is more preferably 30 to 3,000 Pa.

The above-mentioned crystalline polymer is preferable to have a weight average molecular weight of 30,000 to 300,000. The crystalline polymer is preferably crystalline polyester, more preferably polybutylene terephthalate or polyethylene terephthalate, more preferably a crystalline polyamide, and even more preferably comprises a crystalline polyamide and crystalline polyester.

The above-mentioned non-crystalline polyester is preferably those obtained by polymerizing monomer mixtures mainly containing terephthalic acid and neopentyl glycol as well as ethylene glycol and/or 1,4-butanediol.

The non-crystalline polyester is preferable to comprise a non-crystalline polyester with a weight average molecular weight 3,000 to 20,000 and a non-crystalline polyester with a weight average molecular weight 30,000 to 300,000.

The non-crystalline polyester is preferable to contain 90% by weight or more of the non-crystalline polyester with a molecular weight of 1,000 to 300,000 and in the non-crystalline polyester with a molecular weight of 1,000 to 300,000, it is preferable that 40 to 90% by weight thereof has a molecular weight of 1,000 to 200,000 and 10 to 60% by weight thereof has a molecular weight of 20,000 to 300,000.

The above-mentioned crystalline polymer and the non-crystalline polyester are preferable to be compatible with each other and to have a glass transition temperatures C (° C.) satisfying the following formula (3) in relation to the glass transition temperature A (° C.) of the crystalline polymer and the glass transition temperature B (° C.) of the non-crystalline polyester:

$$sA + tB - 2 \leq C \leq sA + tB + 2 \quad (3)$$

in the formula (3), the reference character s represents the weight ratio of the crystalline polymer in the resin composition for a toner and the reference character t represents the weight ratio of the non-crystalline polyester in the resin composition for a toner.

The resin composition for a toner of the invention is preferable to have an acid value of 1 to 30.

A toner, which is obtainable by using the resin composition for a toner of the present invention is also one of the invention.

The toner of the invention is preferable to contain a low melting point compound with a melting point of 70 to 120° C. The above-mentioned low melting point compound is preferable to be a crystalline polyester and a wax.

DETAILED DESCRIPTION OF THE INVENTION

Hereinafter, the invention will be described in detail.

A resin composition for a toner of the invention contains a crystalline polymer and a non-crystalline polyester. The crystalline polymer in this description means a polymer having a sharp and clear melting point peak when subjected to differential heat measurement by a differential scanning calorimeter and a crystallinity exceeding 10% and the non-crystalline polyester means a polyester having no sharp and clear melting point peak when subjected to differential heat measurement by a differential scanning calorimeter and a crystallinity of 10% or less.

Use of the resin composition for a toner of the invention makes it possible to produce a toner excellent in the low temperature fixation property, the high temperature offset resistance, and the blocking resistance and capable of carrying out good coloration. It is supposedly attributed to that, in the resin composition for a toner of the invention, the crystal components of the crystalline polymer with a high melting point form physical crosslinking structure in the non-crystalline polyester and on the other hand, the non-crystalline components in the crystalline polymer with a high melting point and the non-crystalline polyester are intertwisted to form a kind of network structure and such network structure formation suppresses decrease of the viscosity at a high temperature and deterioration of the low temperature fixation property and storage stability and draws good offset resistance. Formation of such network structure exhibits excellent effects at first which cannot be achieved only by simply mixing a plurality of resins.

That is, in the resin composition for a toner of the invention, the crystalline polymer having a high melting point and capable of forming physical crosslinking structure and the non-crystalline polyester forming no physical crosslinking structure and having a glass transition temperature of 30 to 80° C. are mixed to improve the high temperature offset resistance and at the same time to improve the luster and the low temperature fixation property. Since the resin composition contains the crystalline polymer capable of forming physical crosslinking structure and the non-crystalline polyester forming no physical crosslinking structure and having a glass transition temperature of 30 to 80° C. together, the polymer viscosity is increased so that the offset resistance is improved and on the other hand, since the viscosity of the polymer is decreased when pressure application by a fixing roller, the smoothness of the printing surface is increased to result in good luster and improvement of the low temperature fixation property as well.

The toner using the resin composition for a toner of the invention is excellent in the image reproducibility. It is supposedly attributed to that since the above-mentioned network structure is formed in the entire resin composition for a toner of the invention, the toner obtained in the pulverization step is stabilized in the charge bearing property and thus is excellent in the image reproducibility without fogging.

To give such uniform and micro-dispersed structure in nano-micron order and form the above-mentioned network structure, it is very important that the crystalline polymer and the non-crystalline polyester have high compatibility with each other and the crystalline polymer has a high crystallinity.

The resin composition for a toner of the invention has preferably heat absorption of 1 mJ/mg in the lower limit and 20 mJ/mg in the upper limit at the melting point measured by differential scanning calorimeter (DSC). If it is less than 1 mJ/mg, no such network structure described above is formed to give no desired effect of high temperature offset resistance or the like and if it exceeds 20 mJ/mg, the polymer viscosity is not sufficiently decreased at the time of pressure application by a fixing roll to make the printing surface uneven after fixation, resulting in deterioration of luster and low temperature fixation property. The lower limit is more preferably 2 mJ/mg and the upper limit is more preferably 15 mJ/mg.

The crystal forming the above-mentioned physical crosslinking structure is preferable to have 5 μm or smaller size and be evenly and finely dispersed in the resin composition for a toner of the invention. The size is more preferably 1 μm or smaller. Owing to micro-dispersion of the ultrasmall crystal, the network structure is more stabilized to result in excellent effect. In particular, it is preferably that crystalline particles have an average particle diameter of 5 μm or smaller when the resin composition for a toner of the invention is observed by polarizing microscope. The crystalline particles in this description mean granular structures formed by forming the physical crosslinking structure from the crystalline components in the crystalline polymer.

The method for measuring the average particle diameter of the above-mentioned crystalline particles is not particularly limited and may be a method as follows. That is, a resin composition for a toner of the invention is mounted on a prepared slide and heated to about 100° C. for softening by a hot plate or the like and then covered with cover glass and lightly pressurized. After that, the specimen is heated to 150° C. to recrystallize the resin in the amorphous state and then cooled to a room temperature. The obtained specimen is observed using a polarizing microscope with 200 times magnification to measure the particle diameter of distinguishable crystalline particles and the average of the diameter is calculated.

The resin composition for a toner of the invention is preferable to have a haze value of 60% or higher measured by a method according to JIS K 7105. If the haze value is 60% or higher, the crystal forming the above-mentioned physical crosslinking structure has a size of 5 μm or smaller and is evenly and finely dispersed and such a resin composition for a toner of the invention is excellent in the low temperature fixation property, the high temperature offset resistance, and blocking resistance and capable of carrying out good coloration. If the haze value is less than 60%, the crystalline particles are coagulated and not dispersed evenly and therefore, cannot form the above-mentioned network structure.

The haze value can be calculated by measuring the total luminous transmittance Ti (%) and the diffuse transmittance Td (%) and applying these values to the following equation (4) by a method according to JIS K 7105.

$$\text{Haze value } H(\%) = Td(\%)/Ti(\%) \times 100 \quad (4)$$

The resin composition for a toner of the invention is preferable to have 30° C. or narrower difference between a recrystallization initiating temperature Tic and a recrystallization peak temperature Tpc measured using a differential scanning calorimeter (DSC). The inventors of the invention have found that the dispersion state of crystalline particles forming the physical crosslinking structure in the resin composition for a toner is closely related with the recrystallization temperature of the resin composition. That is, if the crystal components in the resin fine particles exist unevenly, the recrystallization is supposed to start at a relatively low temperature in the portion where the crystal component concentration is relatively high and is not supposed to start in the portion where the crystal component concentration is relatively low until it becomes a relatively high temperature and on the other hand, if the crystal components are even in the resin fine particles, such recrystallization temperature difference is not supposed to occur. Accordingly, the difference of the recrystallization initiating temperature Tic and the recrystallization peak temperature Tpc is supposed to reflect the dispersion degree of the crystalline components in the resin fine particles and it is supposed that as the difference is smaller, the crystalline components are dispersed more evenly. If the difference of the recrystallization initiating temperature Tic and the recrystallization peak temperature Tpc measured by a differential scanning calorimeter (DSC) is 30° C. or less, the crystalline particles forming the physical crosslinking structure are evenly and finely dispersed in the resin composition and such a resin composition for a toner of the invention is excellent in the low temperature fixation property, the high temperature offset resistance, and the blocking resistance and capable of carrying out good coloration. If the difference of the recrystallization initiating temperature Tic and the recrystallization peak temperature Tpc exceeds 30° C., since the crystalline components are not evenly dispersed, no network structure can be formed to fail the above-mentioned effects.

The above-mentioned recrystallization initiating temperature Tic in this description means the temperature at the rise up point of the heat radiation peak showing the recrystallization observed in the measurement using a differential scanning calorimeter (DSC) and the recrystallization peak temperature Tpc means the temperature at the summit of the heat absorption peak showing the recrystallization. The measurement conditions by the differential scanning calorimeter (DSC) are not particularly limited, however according to JIS K7121, these values can be measured by heating a specimen 10 mg at 10° C./min rate.

The recrystallization initiating temperature Tic is preferably 80° C. or higher. If it is lower than 80° C., the resin composition for a toner of the invention sometimes changes its crystalline state during storage. If the recrystallization initiating temperature Tic is 80° C. or higher, crystallization is caused in kneading state and therefore the crystalline components can be dispersed evenly.

The resin composition for a toner of the invention is, when 5% shear strain is applied at 190° C., preferable to have 15 to 90 change rate D of the relaxation modulus defined by the following equation (1):

$$D = (1 - G_{5\%}(0.1)/G_{5\% \, max}) \times 100 \quad (1)$$

in the formula, $G_{5\%}(0.1)$ represents the relaxation modulus after 0.1 second from 5% shear strain application and $G_{5\% \, max}$ represents the relaxation modulus at the peak point of the relaxation modulus curve in a graph showing the time of shear strain application in the horizontal axis and the relaxation modulus in the vertical axis.

If the change rate D of the relaxation modulus is less than 15, the viscosity of the toner is not sufficiently decreased at the time of pressure application by a fixing roll to form uneven printing surface to result in deterioration in luster or low temperature fixation property and if it exceeds 90, the above-mentioned network structure is difficult to be formed and therefore, sufficient high temperature offset resistance cannot be obtained in some cases.

The resin composition for a toner of the invention is, when 450% shear strain is applied at 190° C., preferable to have −27 or higher slope K of the relaxation modulus curve observed after 0.02 seconds to 0.1 seconds from the moment of the shear strain application defined by the following formula (2):

$$K=\{(\text{Log}(G(0.1))-\text{Log}(G(0.02)))\}/(0.1-0.02) \quad (2)$$

in the formula, G(0.02) represents the relaxation modulus after 0.02 seconds from the shear strain application and G(0.1) represents the relaxation modulus after 0.1 seconds from the shear strain application.

The slope K of the relaxation modulus curve expresses an elastic behavior of a substance and if it is closer to 0, it means the property closer to rubber elasticity. That the slope K is −27 or higher in the relaxation modulus curve supposedly means the network structure is formed in the resin composition for a toner of the invention and it is supposed that the non-crystalline components in the crystalline polymer with a high melting point and non-crystalline polyester are intertwisted around the crystalline components evenly dispersed and forming the physical crosslinking structure and thus give the rubber-like property. Accordingly, the resin composition for a toner of the invention which has −27 or smaller slope K of the relaxation modulus curve can give a toner excellent in the low temperature fixation property, the high temperature offset resistance, and the blocking resistance and capable of carrying out good coloration. If the slope K of the relaxation modulus curve is less than −27, no such network structure as described above is formed and no such an effect can be obtained.

The resin composition for a toner of the invention is preferable to have the G(0.1) representing the relaxation modulus after 0.1 seconds from 450% shear strain application at 190° C. in a range of 30 to 3,000 Pa. Based on the results of intensive investigations, inventors of the invention have found the offset of a toner occurs when the coagulating force of a melted toner is smaller than the adhesion force between the toner and the thermal fixing roller and the high temperature offset resistance of the toner is relevant to the coagulation force of the resin composition for a toner and the relaxation modulus of the resin composition for a toner under significant deformation. Further, based on the intensive investigations, inventors have found that if a resin composition for a toner having a certain constant relaxation modulus is used, the low temperature fixation property can be improved while the high temperature offset resistance of the toner is kept high as it is. If the relaxation modulus G(0.1) is less than 30 Pa, the high temperature offset resistance of the toner to be obtained is sometimes insufficient and a sufficiently wide fixation temperature range cannot be obtained. If it exceeds 3,000 Pa, the low temperature fixation property of the toner to be obtained is sometime insufficient.

The above-mentioned relaxation modulus can be measured by using a testing specimen obtained by melting a resin for a toner of the invention and molding the melted resin in a disk like shape with a prescribed size by a relaxation modulus measurement apparatus (e.g. RMS-800, manufactured by Rheometric Scientific, Inc.).

The resin composition for a toner of the invention is preferable to have an elasticity tangent tan δ (120) at 120° C. of 0.5 as a lower limit and 2 as an upper limit measured at angular frequency 62.8 rad/sec and strain amplitude 1% and an elasticity tangent tan δ (160) at 160° C. of 0.5 as a lower limit and 5 as an upper limit. If the elasticity tangent tan δ (120) is lower than 0.5, the low temperature fixation property of the toner to be obtained is sometimes insufficient and if it exceeds 2, the high temperature offset resistance of the toner to be obtained is sometimes insufficient. Also, if the elasticity tangent tan δ (160) is lower than 0.5, the low temperature fixation property of the toner to be obtained is sometimes insufficient and if it exceeds 5, the high temperature offset resistance of the toner to be obtained is sometimes insufficient.

The above-mentioned elasticity tangent tan δ can be measured by using a testing specimen obtained by compression molding a resin for a toner of the invention in a disk like shape with a prescribed size by a modulus elasticity measurement apparatus (e.g. RMS-800, manufactured by Rheometric Scientific, Inc.).

The resin composition for a toner of the invention is preferable to have a penetration degree at 60° C. less than 10 (unit 0.1 mm). If the penetration degree exceeds 10, the blocking resistance of the toner to be obtained is sometimes insufficient.

The penetration degree can be measured by the method according to ASTM D 1321.

The crystalline polymer has heat absorption of 25 to 150 mJ/mg at a melting point measured by a differential scanning calorimeter (DSC). If it is less than 25 mJ/mg, it is difficult to form the above-mentioned network structure and accordingly, the desired effect such as high temperature offset resistance cannot be obtained and if it exceeds 150 mJ/mg, the viscosity of the polymer is not decreased sufficiently at the time of pressurizing by a fixing roll and the printing surface becomes uneven after fixation and accordingly luster is deteriorated and the low temperature fixation property is deteriorated. It is preferably 40 to 100 mJ/mg.

The measurement conditions of the differential scanning calorimeter (DSC) are not particularly limited, however according to JIS K 7121, measurement may be carried out using a specimen 10 mg by heating at 10° C./min temperature increasing rate.

The melting point of the crystalline polymer is 180 to 280° C. If it is lower than 180° C., the high temperature offset resistance is insufficient or filming is caused easily to result in insufficient durability. If it exceeds 280° C., it is required to melt the polymer at a temperature exceeding 280° C. at the time of mixing with the non-crystalline polyester, so that the productivity is considerably worsened. It is preferably 200 to 240° C. and more preferably 221° C. in the lower limit.

To shorten the rise up time (warm up time) after tuning on of a switch of a copying machine or a printer, a fixing roller has to be heated quickly to a prescribed fixing temperature and in this case, owing to overshoot, the fixing roller at first tends to be at higher temperature than the prescribe fixing temperature. Accordingly, in order to carry out printing well even in such state, the toner is required to have good high temperature offset resistance. As the fixing temperature is lower and the high temperature offset resistance is higher, the warm up time can be shortened more. In general, to give a sufficiently wide option of the hardware design, the high temperature offset resistance is required to stand at 180° C. or higher. If the melting point of the crystalline polymer is 180° C. or higher, it is supposed that the crystalline portion of the crystalline polymer is not melted even at a high temperature and the above-mentioned network structure can be maintained and thus the high temperature offset resistance is improved. Further, along with speed up of copying machines or printers, a toner which does neither produce a fine powder nor cause filming even in a case of a high speed rotation is desired. Particularly, in the case of one-component type non-magnetic toners which is charged by mechanical contact with a blade, such requirement for durability is much higher. If the melting point of the crystalline polymer is 180° C., the coagulation force of the crystalline portion of the crystalline polymer is high and the above-mentioned network structure is strengthened to possibly result in improvement of the durability.

The weight average molecular weight of the crystalline polymer is preferably 30,000 in the lower limit and 300,000 in the upper limit. If it is lower than 30,000, the offset resistance and the durability of the toner to be obtained may be insufficient and if it exceeds 300,000, the low temperature fixation property and the luster may be deteriorated in some cases. It is supposedly attributed to that the network structure cannot be formed sufficiently if it is out of the above-mentioned range. The lower limit is more preferably 50,000 and the upper limit is more preferably 200,000 and the lower limit is even more preferably 80,000 and the upper limit is even more preferably 150,000.

The crystalline polymer is not particularly limited, however crystalline polyesters or crystalline polyamides are preferable. These crystalline polyesters and crystalline polyamides may be used alone or in combination. In the combination use, the high temperature offset resistance can be improved more by synergetic effects of two kinds of crystalline polymers. The crystalline polymer may be copolymers with non-crystalline polymers if the copolymers entirely satisfy the above-mentioned heat absorption and other conditions.

The crystalline polyester can be obtained by condensation polymerization of dicarboxylic acids and diols.

Examples of the dicarboxylic acids are o-phthalic acid, terephthalic acid, isophthalic acid, succinic acid, adipic acid, sebacic acid, azelaic acid, octylsuccinic acid, cyclohexanedicarboxylic acid, naphthalenedicarboxylic acid, fumaric acid, maleic acid, itaconic acid, decamethylenecarboxylic acid, and their anhydrides and lower alkyl esters. Among them, to provide crystallinity, terephthalic acid, naphthalenedicarboxylic acid and their anhydrides and lower alkyl esters are preferable to be used.

Examples of the diols are aliphatic diols such as ethylene glycol, 1,3-propane diol, 1,4-butanediol, diethylene glycol, 1,5-pentanediol, 1,6-hexanediol, dipropylene glycol, triethylene glycol, tetraethylene glycol, 1,2-propanediol, 1,3-butanediol, 2,3-butanediol, neopentyl glycol (2,2-dimethylpropane-1,3-diol), 1,2-hexanediol, 2,5-hexanediol, 2-methyl-2,4-pentanediol, 3-methyl-1,3-pentanediol, and 2-ethyl-1,3-hexanediol; and alicyclic diols such as 2,2-bis(4-hydroxycyclohexyl)propane, alkylene oxide addition products of 2,2-bis(4-hydroxycyclohexyl)propane, 1,4-cyclohexanediol, and 1,4-cyclohexanedimethanol.

As the crystalline polyester, polybutylene terephthalate (PBT) and polyethylene terephthalate (PET) are particularly preferable. Polybutylene terephthalate (PBT) has a high crystallization speed and a high crystallinity and accordingly, a toner obtained using it is excellent in the offset resistance. Further, since is it excellent in the compatibility with the non-crystalline polyester, a toner obtained using it is excellent in the low temperature fixation property and luster.

Polyethylene terephthalate (PET) has a high crystal melting point and accordingly, a toner obtained using it is excellent particularly in high temperature offset resistance. Additionally, although polyethylene terephthalate (PET) is inferior in the crystallization speed and crystallinity to polybutylene terephthalate (PBT), such inferior properties can be improved by adding a crystal nucleator.

These crystalline polyesters may be used alone or two or more of them may be used in combination.

Examples of the crystalline polyamide are 6-nylon, 6,6-nylon, 4,6-nylon, 11-nylon, and 12 nylon. Especially, 6-nylon and 6,6-nylon crystals have high coagulation force and are excellent in the effect to improve the high temperature offset resistance and therefore, they are preferable. Polyamide-polyester copolymers obtained by copolymerization of these crystalline polyamides and polyesters are also preferable since they are excellent in the compatibility with non-crystalline polyesters. These crystalline polyamides may be used alone or two or more of them may be used in combination.

Since the crystalline polyamide has a high intermolecular coagulation force, the polyester is provided with high temperature offset resistance by using even a slight amount of the polyamide to the polyester to increase the strength of the resin itself.

The glass transition temperature of the non-crystalline polyester is 30 to 80° C. If it is lower than 30° C., sufficient high temperature offset resistance and blocking resistance cannot be obtained and if it exceeds 80° C., the low temperature fixation property is deteriorated. It is preferably 50 to 65° C.

The non-crystalline polyester can be obtained by condensation polymerization of dicarboxylic acids and diols.

The glass transition temperature of the non-crystalline polyester is related to improvement of the glass transition temperature of aromatic dicarboxylic acids such as terephthalic acid and decrease of the glass transition temperature of long chain aliphatic dicarboxylic acids such as sebacic acid and adipic acid and thus an aimed glass transition temperature can be obtained by properly combining these dicarboxylic acids. However, even if the desired glass transition temperature is obtained by properly combining these dicarboxylic acids, the softening temperature tends to be too high.

Therefore, the non-crystalline polyester is preferable to be those obtained by polymerization monomer mixtures containing polycarboxylic acid and polyhydric alcohols including at least divalent bending monomers capable of introducing bending molecular structure into molecular chains or branched divalent monomers.

The polymers obtained by polymerization of the monomer mixtures containing divalent bending monomers or branched divalent monomers can easily satisfy both of the aimed glass transition temperature and low softening temperature and effectively suppress crystallization.

The divalent bending monomers are not particularly limited to dicarboxylic acids and diols if they are monomers, such as aromatic dicarboxylic acids having a carboxyl substituent group at the orth or meta-position, aromatic diols having a hydroxy substituent group at the orth or meta-position, polycyclic aromatic dicarboxylic acids having carboxyl groups at asymmetric positions, polycyclic aromatic diols having hydroxyl groups at asymmetric positions, which can introduced bending molecular structure into the polymer molecular chains and examples of the divalent bending monomers may be dicarboxylic anhydrides, lower esters, or monohydroxymonocarboxylic acids and practical examples are dicarboxylic acids, their anhydrides and lower esters such as phthalic anhydride, o-phthalic acid, isophthalic acid, 1,4-napthalenedicarboxylic acid, and 2,7-napthalenedicarboxylic acid; monohydroxymonocarboxylic acids such as salicylic acid and 3-hydroxy-2-nephthalenecarboxylic acid; and diols such as catechol and 1,4-cyclohexanedimethanol.

The divalent monomers having branched chains efficiently suppress crystallization of polymers owing to the steric hindrance of the branched chains. Monomers having the branched chains capable of efficiently suppress the crystallization may include aliphatic diols having branched alkyl chains and alicyclic diols having branched alkyl chains. As the alicyclic diols, those comprising a plurality of alicyclic diols bonded to one another through branched alkylene chains are preferable.

The divalent monomers having the branched chains are not particularly limited and examples of the monomers are aliphatic diols such as 1,2-propanediol, 1,3-butanediol, 2,3-butanediol, neopentyl glycol (2,2-dimethylpropane-1,3-diol), 1,2-hexanediol, 2,5-hexanediol, 2-methyl-2,4-pentanediol, 3-methyl-1,3-pentanediol, 2-ethyl-1,3-hexanediol, 2-butyl-2-ethyl-1,3-propanediol, and 2,4-diethyl-1,5-pentanediol; and alicyclic diols such as 2,2-bis(4-hydroxycyclohexyl)propane, and alkylene oxide addition products of 2,2-bis(4-hydroxycyclohexyl)propane.

Among them, the non-crystalline polyesters obtained by polymerization of a monomer mixture containing terephthalic acid and neopentyl glycol as well as ethylene glycol and/or 1,4-butene diol as main components are preferable since they are excellent in low temperature fixation property and transparency.

The non-crystalline polyester preferably contains two types of non-crystalline polyesters with different average molecular weights. The melt viscosity of the non-crystalline polyester is determined depending on the molecular weight. If those with smaller molecular weights are used as the non-crystalline polyester, the melt viscosity of the toner to be obtained is lowered and therefore, an excellent low temperature fixation property can be obtained. However, in the case of using the non-crystalline polyester with a low molecular weight, the toner to be obtained is inferior in the high temperature offset resistance and the storage stability and it becomes difficult to knead the non-crystalline polyester with the above-mentioned crystalline polymer. Based on the investigations, inventors of the invention have found that use of a non-crystalline polyester with a small average molecular weight in combination with a non-crystalline polyester with a high average molecular weight makes it possible to significantly improve the high temperature offset resistance, storage stability and suitability for kneading them with the crystalline polymer and maintain the excellent low temperature fixation property.

The combination of the two non-crystalline polyesters with different weight average molecular weights is not particularly limited and it is preferable to use a non-crystalline polyester with a weight average molecular weight of 3,000 to 20,000 as the one with the lower weight average molecular weight and a non-crystalline polyester with a weight average molecular weight of 30,000 to 300,000 as the other with the higher weight average molecular weight. If the weight average molecular weight of the non-crystalline polyester with the lower average molecular weigh is less than 3,000, the strength of the resin composition for a toner is lowered and durability of the toner to be obtained is insufficient and if it exceeds 20,000, excellent low temperature fixation property cannot be obtained in some cases. The upper limit of it is more preferably 8,000. If the weight average molecular weight of the non-crystalline polyester with the higher average molecular weight is less than 30,000, the high temperature offset resistance, the storage stability, and the suitability for kneading with the crystalline polymer of the toner to be obtained are insufficient and if it exceeds 300,000, the low temperature fixation property of the toner to be obtained is insufficient in some cases.

The mixing ratio of the non-crystalline polyester with a weight average molecular weight of 3,000 to 20,000 and the non-crystalline polyester with a weight average molecular weight of 30,000 to 300,000 is preferably 40 to 90% by weight of the non-crystalline polyester with a weight average molecular weight of 3,000 to 20,000 and 10 to 60% by weight of the non-crystalline polyester with a weight average molecular weight of 30,000 to 300,000. If the mixing ratio of the non-crystalline polyester with a weight average molecular weight of 3,000 to 20,000 is less than 40% by weight, the low temperature fixation property of the toner to be obtained is insufficient in some cases and if it exceeds 90% by weight, the high temperature offset resistance, the storage stability, and the suitability for kneading with the crystalline polymer of the toner to be obtained are insufficient in some cases.

The non-crystalline polyesters are preferable to contain 90% by weight of the polyester with a molecular weight of 1,000 to 300,000 and in the polyester with a molecular weight of 1,000 to 300,000, it is preferable that 40 to 90% by weight has a molecular weight of 1,000 to 200,000 and 10 to 60% by weight has a molecular weight of 20,000 to 300,000.

The crystalline polymer and the non-crystalline polyester are preferable to be compatible with each other. Good compatibility of the crystalline polymer and the non-crystalline polyester makes stable network structure formation possible. Further, in the case the crystalline polymer and the non-crystalline polyester are compatible, the resin composition for a toner of the invention becomes colorless and transparent and preferably usable for resin composition for a color toner capable of carrying out good coloration. Further, since a high resin strength is provided, the resin composition can be usable as a resin composition for a toner excellent in the durability and the high temperature offset resistance.

In this description, compatibility means the state that the crystalline polymer and the non-crystalline polyester are evenly mixed and it includes complete compatibility and partial compatibility.

To make the crystalline polymer and the non-crystalline polyester be compatible with each other, it is preferable that the glass transition temperature C (° C.) of the resin composition for a toner of the invention satisfies the following formula (3) in relation to the glass transition temperature A (° C.) of the crystalline polymer and the glass transition temperature B (° C.) of the non-crystalline polyester:

$$sA+tB-2 \leq C \leq sA+tB+2 \quad (3)$$

in the formula (3), the reference character s represents the weight ratio of the crystalline polymer in the resin composition for a toner and the reference character t represents the weight ratio of the non-crystalline polyester in the resin composition for a toner.

In the case the glass transition temperature of the resin composition for a toner of the invention satisfies the above-mentioned formula (3), the crystalline polymer and the non-crystalline polyester are excellently compatible.

The compatibility is improved by using a crystalline polyester as the crystalline polymer and further by using monomer components such as terephthalic acid as a common monomer for the constituent monomers of the crystalline polyester and the non-crystalline polyester. For example, if the crystalline polyester is polybutylene terephthalate (PBT) or polyethylene terephthalate (PET) and the non-crystalline polyester is obtained by polymerization of a monomer mixture containing mainly terephthalic acid and neopentyl glycol as well as ethylene glycol and/or 1,4-butanediol, both are well compatible with each other.

The contents of the crystalline polymer and the non-crystalline polyester in the resin composition for a toner of the invention are preferable to be 2% by weight in the lower limit and 30% by weight in the upper limit for the crystalline polymer and 70% by weight in the lower limit and 98% by weight in the upper limit for the non-crystalline polyester.

If the content of the crystalline polymer is less than 2% by weight, the high temperature offset resistance is deteriorated in some cases and if it exceeds 30% by weight, the low temperature fixation property is deteriorated in some cases. The lower limit of the content is more preferably 3% by weight and the upper limit is more preferably 20% by weight. The lower limit of the content is even more preferably 5% by weight and the upper limit is even more preferably 15% by weight.

The molecular weight characteristics of the resin composition for a toner of the invention can be provided by combination of the molecular weights of the crystalline polymer and non-crystalline polyester components and may be adjusted by further adding another low molecular weight non-crystalline polyester with a weight average molecular weight of 3,000 to 8,000. The low molecular weight non-crystalline polyester to be used may be same as the non-crystalline polyester.

The resin composition for a toner of the toner is preferable to contain also a crystal nucleator. Addition of the crystal nucleator promotes crystallization of the crystalline polymer components. The crystal nucleator are not limited and may include metal oxides such as zinc oxide, magnesium oxide, silicon oxide, ferric oxide (III), and titanium oxide; inorganic salts such as calcium carbonate, magnesium carbonate calcium silicate, lead silicate, magnesium silicate, calcium phosphate, calcium sulfate, barium sulfate, and potassium titanate; organic acid salts such as calcium oxalate and sodium oxalate; clay minerals such as talc, kaolin, clay mica, and wollastonite. The shape of the crystal nucleator is not particularly limited and may be platy, spherical, and amorphous.

The acid value of the resin composition for a toner of the invention is not particularly limited, however it is preferably 1 to 30. Such acid value is derived from the acidic functional groups at the terminals of the main chains of the above-mentioned crystalline polymer or non-crystalline polyester components and more particularly from carboxyl groups. If the acid value is in the range, the toner to be obtained is provided with good affinity with paper in addition to the excellent low temperature fixation property.

With respect to the resin composition for a toner of the invention, different from a conventional crosslinking type resin composition for a toner containing a high molecular weight polymers with a molecular weight as high as 1,000,000, the resin composition for a toner of the invention contains polymers with molecular weight as high as about several hundred thousands alone and therefore, the acidic functional groups are relatively evenly distributed to result in a further improved low temperature fixation property.

The method of producing the resin composition for a toner of the invention is not particularly limited and methods involving separately producing the crystalline polymer and the non-crystalline polyester and mixing the obtained crystalline polymer and non-crystalline polyester at the temperature equal to or higher than the melting point of the crystalline polymer can be exemplified.

The resin composition for a toner of the invention is used as a binder resin and further, based on the necessity, a coloring agent, a charge control agent, a magnetic substance, a rubber type polymer, a toner resin containing styrene-acrylic acid ester copolymer, a carrier, a cleaning property improver and the like are added and mixed to produce a toner. The invention also provides such a toner.

The coloring agent is not particularly limited and may include carbon black such as furnace black, lamp black, thermal black, acetylene black, and channel black; aniline black, phthalocyanine blue, quinoline yellow lamp black, Rhodamine B, azo type pigments, perylene type pigments, perinone type pigments, anthraquinone type pigments, dioxazine type pigments, isoindoline type pigments, isoindolinone type pigments, threne type pigments, indigo type pigments, quinophthalone, diketopyrrolopyrrole, quinacridone, and the like. The addition amount of these coloring agents is preferably 1 to 10 parts by weight to 100 parts by weight of the resin composition for a toner.

There are two types; positive charge and negative charge, of the charge control agent. The positive charge control agent may include Nigrosine dye, ammonium salts, pyridinium salts, and azine and the negative charge control agent may include chromium complexes and iron complexes. Among them, acid-modified charge control agents are preferable and in the case of a salicylic acid-modified agent, it is crosslinked with the resin composition for a toner to provide rubber elasticity. Since a metal complex of alkylsalicylic acid such as chromium-di-tert-butylsalicylic acid complex or zinc di-tert-butylsalicylic acid complex is colorless or pale color, it does not affect to color tone on the toner and therefore is preferable. As the charge control agent, a charge control resin (CCR) is also preferable to be used. The charge control resin may include, for example, styrene acryl polymers obtained by copolymerization of monomers containing quaternary ammonium salts, organic fluoro monomers, sulfonic acid group-containing monomers, and phenyl maleimide type monomers. The addition amount of the charge control agents is preferably 0.1 to 10 parts by weight to 100 parts by weight of the resin composition for a toner.

The magnetic substance may include TAROX BL series (trade name: manufactured by TITAN KOGYO K.K.); EPT series, MAT series, and MTS series (trade names: all manufactured by TODA KOGYO CORP.); DCM series (trade name: manufactured by DOWA IRON POWDER CO., LTD.); and KBC series, KBI series, KBF series, and KBP series (trade names: all manufactured by Kanto Denka Kogyo Co., Ltd.); and Bayoxide E series (trade name: manufactured by Bayer AG).

The rubber type polymer may include, for example, natural rubber; synthetic rubber such as polyisoprene, polybutadiene rubber, nitrile rubber (acrylonitrile-butadiene copolymer), chloroprene, butyl rubber, acrylic rubber, polyurethane elastomer, silicone rubber, ethylene-propylene copolymers, ethylene-propylene-diene copolymers, polyethylene chlorosulfine, ethylene-vinyl acetate copolymers, ethylene-acrylic acid copolymers, ethylene-acrylic acid ester copolymers, chlorinated polyethylene, epichlorohydrin rubber, and nitrile isoprene rubber; elastomers such as polyester elastomer and urethane elastomer; and block copolymers of aromatic hydrocarbons and conjugated double bond diene type hydrocarbons such as styrene-butadiene-styrene block copolymers, styrene-isoprene-styrene block copolymers, styrene-ethylene-butylene-styrene block copolymers, and styrene-ethylene-propylene-styrene block copolymers. The block copolymers may be mixed with styrene-butadiene block copolymers and styrene-isoprene block copolymers and also with their hydrogenated products.

The rubber type polymers comprising block copolymers of aromatic hydrocarbons having polar groups such as hydroxyl, carboxyl, aldehyde, sulfonyl, cyano, nitro and halogen groups at the terminal with conjugated dienes are preferable since they are excellent in the compatibility with the toner. These block copolymers having polar groups at the terminal can be obtained by living polymerization.

The rubber type polymers can improve the resin strength of the resin contained in the toner. Accordingly, the toner containing the rubber type polymers can avoid filming phenomenon of the toner itself and is suitable for one-component type nonmagnetic toners which are required to have high resin strength.

As the carrier, metal simple substances such as iron, nickel, copper, zinc, cobalt, manganese, chromium, and rare earth metals, alloys, oxides, and ferrites can be exemplified. The carrier may be oxidized in the surface. Further, the carrier surface may be coated with polytetrafluoroethylene, monochlorotrifluoroethylene polymers, poly(vinylidene fluoride), silicone polymers, polyesters, di-tert-butylsalicylic acid-metal complexes, styrene polymers, acrylic polymers, polyamides, poly(vinyl butyral), Nigrosine basic dyes, silica powder, and alumina powder. Coating of the carrier gives good friction chargeability to the carrier.

As the cleaning property improver, those which can improve the fluidity of the toner by being mixed with the toner particles can be used without any particular limit. If the fluidity of the toner is improved, the toner less adheres to cleaning blades. Examples usable for the improver are fluoropolymer powder such as vinylidene fluoride polymer; acrylic polymer powder such as acrylic acid ester polymer; aliphatic acid metal salt powder such as zinc stearate, calcium stearate and lead stearate powders; metal oxide powder such as zinc oxide and titanium oxide; ultrafine silica powder; silica powder surface-treated with a silane coupling agent, a titanium coupling agent, and silicone oil; and fumed silica.

Further, as the cleaning property improver, spherical particles with a particle diameter of 0.05 to 0.5 μm and made of acrylic polymers and styrene type polymers are also preferably used.

The toner of the invention is preferable to contain a low melting point compound having a melting point of 70 to 120° C. If it is lower than 70° C., the storability and the fluidity of the toner to be obtained are sometimes deteriorated. If it exceeds 120° C., the low temperature fixation property is insufficient in some cases. The low melting point compound having a melting point of 70 to 120° C. is not particularly limited, however a crystalline polyester or wax is preferable.

In the case of using a crystalline polyester as the low melting point compound having a melting point of 70 to 120° C., the crystalline polyester is not particularly limited, however an aliphatic polyester is preferable to be used. The aliphatic polyester is excellent in the compatibility with a polyester type resin composition for a toner and suitable for avoiding dropping of the low melting point compound at the time of toner pulverization, resulting in an improved effect on the low temperature fixation property. Also, since the aliphatic polyester has a higher molecular weight than that of wax, its bleeding from the toner hardly takes place and thus it is excellent in the storability and the fluidity of the toner. Additionally, in the case of using the crystalline polyester as the low melting point compound having a melting point of 70 to 120° C., the low melting point compound having a melting point of 70 to 120° C. may be mixed with the resin composition for a toner.

In the case of using wax as the low melting point compound having a melting point of 70 to 120° C., the wax can also work as a releasing agent.

The wax may be olefin waxes and paraffin waxes such as polypropylene wax, polyethylene wax, microcrytalline wax, and polyethylene oxide wax; aliphatic ester type waxes such as carnauba wax, sazol wax, and montanic acid ester wax; deoxidized carnauba wax; saturated fatty acid waxes such as palmitic acid, stearic acid, and monotanic acid; unsaturated aliphati acid type waxes such as brassidic acid, eleostearic acid, and parinaric acid; saturated alcohol type waxes and aliphatic alcohol waxes such as stearyl alcohol, aralkyl alcohol, behenyl alcohol, and carnaubyl alcohol, ceryl alcohol, and melissyl alcohol; polyhydric alcohol type waxes such as sorbitol; saturated fatty acid amide type waxes such as linoleic acid amide, oleic acid amide, and lauric acid amide; saturated fatty acid bisamide type waxes such as methylene bis(stearic acid amide), ethylene bis(capric acid amide), ethylene bis(lauric acid amide), and hexamethylene bis(stearic acid amide); unsaturated acid amide type waxes such as ethylene bis(oleic acid amide), hexamethylene bis(oleic acid amide), N,N'-dioleyladipic acid amide, and N,N'-dioleyl sebacic acid amide; aromatic bisamide type waxes such as m-xylene bis(stearic acid amide) and N,N'-distearylisophthalic acid amide; fatty acid metal salts such as calcium stearate, calcium laurate, zinc stearate, and magnesium stearate; graft-modified waxes obtained by graft-polymerization of vinyl type monomers such as styrene and acrylic acid with polyolefin; partially esterified waxes obtained by reaction of fatty acids such as behenic acid monoglyceride and polyhydric alcohols; methyl ester waxes having hydroxyl groups and obtained by hydrogenation of plant fats and oils; ethylene-vinyl acetate copolymer waxes with high ethylene component ratio; long chain alkyl acrylate waxes such as saturated stearyl acrylate waxes; and aromatic acrylate waxes such as benzyl acrylate wax. Among them, the long chain alkyl acrylate waxes and aromatic acrylate waxes are preferable since they are excellent in compatibility with the resin composition for a toner and give a toner with excellent transparency. These waxes may be used alone or two or more of them can be used in combination. Particularly, it is preferable to use two or more types of waxes having melting points with 30° C. or wider difference. The size of the waxes in the toner is not particularly limited, however it is preferable to be 2 μm in the longer diameter.

The low melting point compound with a melting point of 70 to 120° C. is preferable to have the difference of the SP value in a range of 0.2 to 3.0 from the value of the resin composition for a toner. If the difference is lower than 0.2, the glass transition temperature of the resin composition for a toner is considerably decreased to result in insufficient storability and if it exceeds 3.0, the compatibility of the low melting point compound with the resin composition for a toner is insufficient and the compound is easily dropped to result in deterioration of the low temperature fixation property.

The SP value is an index showing the affinity of the substance surface and can be evaluated from the solubility in solvents with different SP values.

The low melting point compound with a melting point of 70 to 120° C. is preferable to have dispersion diameter of 0.2 to 3 μm in the toner of the invention. If it is less than 0.2 μm, the glass transition temperature of the resin composition for a toner is considerably decreased to result in insufficient storability in some cases and if it exceeds 3 μm, the compatibility of the low melting point compound with the resin composition for a toner is insufficient and the compound is easily dropped to result in deterioration of the low temperature fixation property in some cases. The diameter is more preferably 0.5 to 2.0 μm.

The mixing amount of the low melting point compound with a melting point of 70 to 120° C. in the toner of the invention is preferably 0.2 to 10% by weight. If it is less than 0.2% by weight, the effect to improve the low temperature fixation property is insufficient in some cases and if it exceeds 10% by weight, the storability is deteriorated in some cases. It is more preferably 0.5 to 4% by weight.

The toner of the invention is preferable to have a peak of a weight average molecular weight at a point of 2,000 or lower in the case of measurement by gel permeation chromatography. Accordingly, the fixation property is improved. The toner of the invention is further preferable to have a peak of a weight average molecular weight at a point of 10,000 or higher in the case of measurement by gel permeation chromatography. Accordingly, the water-proofness is improved.

The particle diameter of the toner of the invention is not particularly limited, however when the size is 10 μm or smaller, particularly high quality images can be obtained. It is more preferably 5 μm or smaller.

The water content of the toner of the invention is not particularly limited, however it is preferably 0.01 to 0.2% by weight. If it is less than 0.01% by weight and production becomes difficult in terms of the issues relevant to the production and if it exceeds 0.2% by weight, sufficient charge stability cannot be obtained in some cases.

The repose angle of the toner of the invention is not particularly limited and the lower limit of the repose angle at 23° C. and 60% humidity is preferably 1 degree and the upper limit is preferably 30 degree. If it is less than 1 degree, handling of the toner becomes difficult in some cases and if it exceeds 30 degree, the fluidity of the toner is insufficient in some cases. The repose angle of the toner can be measured by a powder tester (e.g. PT-N model, manufactured by HOSOKAWAMICRON CORPORATION) and the like.

The surface roughness of the toner is not particularly limited, however it is preferably 0.01 to 2 μm. If it is less than 0.01 μm, it sometimes becomes difficult to carry out printing and if it exceeds 2 μm, the surface luster of the image obtained is sometimes insufficient. The above-mentioned surface roughness can be measured by the method standardized as a method for measuring the arithmetical means deviation (Ra) in the portion of the image printed using the toner of the invention according to JIS B 0601.

In the case the toner of the invention is used for applications for which excellent surface luster is particularly required, the viscosity of the toner of the invention is preferable to be 100 to 50,000 mPa·s as melt viscosity at 150° C. If it is less than 100 mPa·s, the storability is sometimes deteriorated and if it exceeds 50,000 mPa·s, sufficient surface luster cannot be obtained. The upper limit is preferably 10,000 mPa·s.

The toner of the invention can exhibit excellent fixation property in a wide range from a low temperature to a high temperature and is excellent in the low temperature fixation property, the high temperature offset resistance, and the blocking resistance, thus the time from switching on to starting printing can be shortened to result in desirable economical advantage and further, even if the roller temperature is lowered, the image clearness can be maintained and therefore high speed printing is made possible. Since the toner of the invention is colorless and transparent, a desired color can easily be prepared. The toner of the invention is excellent in the image reproducibility.

The toner of the invention may be fixed by a fixing roller coated with release oil and the toner exhibits excellent fixation property even if no release oil is applied to the fixing roller.

The crystalline polymer and the non-crystalline polyester to be used for the resin composition for a toner of the invention gives a toner exhibiting good fixation property in a wide range from a low temperature to a high temperature without being crosslinked or mixed with another high molecular weight resin and excellent in low temperature fixation property, high temperature offset resistance, and blocking resistance. The toner using such an non-crosslinking type resin composition for a toner is easy to be pulverized, shows sharp melting characteristics, and gives fixed images with good luster as compared with a toner using a resin for a toner including high molecular weight resin.

BEST MODE FOR CARRYING OUT THE INVENTION

The invention will be described in detail along with reference to Examples, however it is not intended that the invention is limited to the described Examples.

EXAMPLE 1

(1) Production of Polybutylene Terephthalate (PBT)

A distillation tower, a water separation apparatus, a nitrogen gas introduction pipe, a thermometer, and a stirring apparatus were installed in a reaction container of 60 L capacity according to a common method and under nitrogen gas atmosphere, terephthalic acid 100 mole as a dicarboxylic acid component, 1,4-butanediol 120 mole as a diol component, and titanium tetrabutoxide (TBB) 0.05 mole as an esterification condensation catalyst were fed to the container and esterification was carried out at 200° C. while produced water and methanol were taken out of the distillation tower. When discharge of water and methanol out of the distillation tower was stopped, the esterification reaction was finished.

On completion of the esterification reaction, the opening of the reaction container of 60 L capacity to the distillation tower was closed and at the same time the line from a vacuum pump was opened to reduce the pressure of the reaction system to 5 mmHg or lower and condensation reaction was carried out at 240° C. and 60 rpm stirring speed and simultaneously free diol generated by the condensation reaction was discharged out of the reaction system to obtain polybutylene terephthalate.

(2) Production of Non-crystalline Polyester

A distillation tower, a water separation apparatus, a nitrogen gas introduction pipe, a thermometer, and a stirring apparatus were installed in a reaction container of 60 L capacity according to a common method and under nitrogen gas atmosphere, terephthalic acid 90 mole as a dicarboxylic acid component, isophthalic acid 5 mole and phthalic anhydride 5 mole as bending monomer components, neopentylene glycol 60 mole as a branched monomer component, ethylene glycol 60 mole as another diol, and titanium tetrabutoxide (TBB) 0.05 mole as an esterification condensation catalyst were fed to the container and esterification was carried out at 200° C. while produced water and methanol were taken out of the distillation tower. When discharge of water and methanol out of the distillation tower was stopped, the esterification reaction was finished.

On completion of the esterification reaction, the opening of the reaction container of 60 L capacity system to the distillation tower was closed and at the same time the line from a vacuum pump was opened to reduce the pressure of the reaction system to 5 mmHg or lower and condensation reaction was carried out at 240° C. and 60 rpm stirring speed and simultaneously free diol generated by the condensation reaction was discharged out of the reaction system to obtain non-crystalline polyester.

(3) Production of Resin Composition for Toner and of Toner

The obtained polybutylene terephthlate 7 parts by weight and the non-crystalline polyesters 93 parts by weight were melted and kneaded at 240° C. by using a diaxial extruder and quenched by a belt cooler to obtain a resin composition for a toner.

The obtained resin composition for a toner 100 parts by weight was mixed with a charge controller (BONTRON S-34; manufactured by Orient Chemical Industries, Ltd.) 1 part by weight, carbon black 5 parts by weight, and carnauba wax 1 part by weight and sufficiently stirred by a Henshel type mixer and then the mixture was melted and kneaded at 120° C., cooled and roughly crushed. After that, the mixture was finely crushed by a jet mill (LABO JET; manufactured by Nippon Pneumatic Mfg. Co., Ltd.) to obtain a toner powder with an average particle diameter of about 8 μm. Further, the toner powder was classified by a classifying apparatus (MDS-2; manufactured by Nippon Pneumatic Mfg. Co., Ltd.) to obtain a toner fine powder with an average particle diameter of 10 μm. The obtained toner fine powder 100 parts by weight was mixed evenly with hydrophobic silica (R972: NIPPON AEROSIL CO., LTD.) 1.0 part by weight (extrapolation) to obtain a toner.

EXAMPLES 2 AND 3

Resin compositions for a toner and toners were obtained in the same manner as Example 1, except that the mixing ratios of polybutyrene terephthalate (PBT) and non-crystalline polyesters were changed to the compositions as shown in Table 1 in the production of the resin composition for a toner.

EXAMPLE 4

A crystalline polymer and non-crystalline polyesters were obtained in the same manner as Example 1, except that terephthalic acid 100 mole and ethylene glycol 120 mole were used as the raw material monomers for the crystalline polyester.

A resin composition for a toner and a toner were obtained in the same manner as Example 1, except that the obtained crystalline polyester and non-crystalline polyesters were used and the kneading temperature was changed to 270° C.

COMPARATIVE EXAMPLES 1 AND 2

A crystalline polymer and non-crystalline polyesters were obtained in the same manner as Example 1, except that terephthalic acid 60 mole, isophthalic acid 40 mole, and 1,4-butanediol 120 mole were used as the raw material monomers for the crystalline polyester.

A resin composition for a toner and a toner were obtained in the same manner as Example 1, except that the obtained crystalline polyester and non-crystalline polyesters were used and the kneading temperature was changed to 160° C.

COMPARATIVE EXAMPLES 3

The non-crystalline polyesters 100 parts obtained in Example 1 was mixed with a charge controller (BONTRON S-34; manufactured by Orient Chemical Industries, Ltd.) 1 part by weight, carbon black 5 parts by weight, and carnauba wax 1 part by weight and sufficiently stirred by a Henshel type mixer and then the mixture was melted and kneaded at 120° C., cooled and roughly crushed. After that, the mixture was finely crushed by a jet mill (LABO JET; manufactured by Nippon Pneumatic Mfg. Co., Ltd.) to obtain a toner powder with an average particle diameter of about 8 μm. Further, the toner powder was classified by a classifying apparatus (MDS-2; manufactured by Nippon Pneumatic Mfg. Co., Ltd.) to obtain a toner fine powder with an average particle diameter of 10 μm. The obtained toner fine powder 100 parts by weight was mixed evenly with hydrophobic silica (R972: NIPPON AEROSIL CO., LTD.) 1.0 part by weight (extrapolation) to obtain a toner.

COMPARATIVE EXAMPLES 4

A distillation tower, a water separation apparatus, a nitrogen gas introduction pipe, a thermometer, and a stirring apparatus were installed in a reaction container of 60 L capacity according to a common method and under nitrogen gas atmosphere, terephthalic acid 99 mole as dicarboxylic acid components, trimellitic acid 1 mole, bisphenol A propylene oxide adduct 105 mole as a diol component, and dibutyl tin oxide 0.05 mole as an esterification condensation catalyst were fed to the container and esterification was carried out at 200° C. while produced water and methanol were taken out of the distillation tower. When discharge of water and methanol out of the distillation tower was stopped, the esterification reaction was finished.

On completion of the esterification reaction, the opening of the reaction container of 60 L capacity to the distillation tower was closed and at the same time the line from a vacuum pump was opened to reduce the pressure of the reaction system to 5 mmHg or lower and condensation reaction was carried out at 240° C. and 60 rpm stirring speed and simultaneously free diol generated by the condensation reaction was discharged out of the reaction system to obtain non-crystalline polyester.

A toner was produced in the same manner as Comparative Example 3, except that the obtained non-crystalline polyesters were used.

(Evaluation)

The resin compositions for a toner and toners produced in Examples 1 to 4 and Comparative Examples 1 to 4 were evaluated by the following methods.

The results are shown in Table 1 and Table 2

[Measurement of Molecular Weight and Molecular Weight Distribution]

(1) Crystalline Polyesters and Crystalline Polyamides

Using HTR-C manufactured by Nihon Millipore Corporation as GPC measurement apparatus, HFIP-806 M (two columns) manufactured by SHOWA DENKO K.K. and connected in series were used as columns to measure the weight average molecular weight. The measurement conditions were 40° C. temperature, a 0.1 wt. % hydroxyfluoroisopropanol (HFIP) solution (filtered through 0.45 μm meshes) as a specimen, 100 μL injection amount, and HFIP containing TFA 0.68 g/L as a carrier solvent. Standardized polystyrenes were used as calibration samples.

(2) Non-crystalline Polyesters

Using HTR-C manufactured by Nihon Millipore Corporation as GPC measurement apparatus, KF-800P (one column), KF-806M (two columns), and KF-802.5 (one column) manufactured by SHOWA DENKO K.K. and connected in series were used as columns to measure the weight average molecular weight. The measurement conditions were 40° C. temperature, a 0.2 wt. % THF solution (filtered through 0.45 μm meshes) as a specimen, 100 μL injection amount, and THF as a carrier solvent. Standardized polystyrenes were used as calibration samples.

(3) Resin Composition for a Toner and Toners

Using HTR-C manufactured by Nihon Millipore Corporation as GPC measurement apparatus, KF-800P (one column), KF-806M (two columns), and KF-802.5 (one column) manufactured by SHOWA DENKO K.K. and connected in series were used as columns to measure the molecular weight and molecular weight distribution. The measurement conditions were 40° C. temperature, a 0.2 wt. % THF solution (filtered through 0.45 μm meshes) as a specimen, 100 μL injection amount, and THF as a carrier solvent. Standardized polystyrenes were used as calibration samples.

[Measurement of Glass Transition Temperature (Tg)]

After held at a temperature equal to or higher than the melting point for a while, the resin compositions for a toner were quenched to obtain samples with completely suppressed crystallization. Each sample was subjected to measurement standardized in 9.3 "Measurement of Glass Transition Temperature", according to a method of JIS K 7121 at temperature increasing rate of 10° C./min by a differential scanning calorimeter (DSC-6200R, manufactured by Seiko Instruments & Electronics Ltd.) to measure intermediate glass transition temperature.

[Measurement of Crystal Melting Point and Heat Absorption]

Using a differential scanning calorimeter (DSC-6200R, manufactured by Seiko Instruments & Electronics Ltd.), 10 mg of each specimen was heated at temperature increasing rate of 10° C./min and subjected to measurement standardized in 9.1 "Measurement of Melting Temperature", according to a method of JIS K 7121 to measure crystal melting point Tm and the heat absorption at the crystal melting point Tm was calculated from the DSC chart.

[Acid Value Measurement]

Acid value was calculated by the method according to JIS K 6751 using tetrahydrofuran (THF) in place of ethyl alcohol.

[Evaluation of Color Tone]

The color of each resin composition for a toner was observed with eyes.

[Evaluation of Average Particle Diameter of Crystalline Particle]

Each resin composition for a toner was mounted on a preparation and heated to about 100° C. for softening by a hot plate or the like and then covered with cover glass and lightly pressurized. After that, the specimen was heated to 150° C. to recrystallize the resin in the amorphous state and then cooled to a room temperature. The obtained specimen was observed using a polarizing microscope with 200 times magnification (manufactured by Olympus Corporation) to measure the particle diameter of distinguishable crystalline particles and the average of the diameter was calculated. Measurement was carried out in 5 photographic fields and the average value was calculated.

[Measurement of Haze Value]

A 1 mm thick plate-like sample was produced by hot pressing each resin composition for a toner at 150° C. With respect to the sample, the haze value was calculated according to a method described in JIS K 7105 by measuring the total luminous transmittance Ti (%) and the diffuse transmittance Td (%) using TC-HIIIDPK manufactured by Tokyo Denshoku Co., Ltd. and applying these values to the above-mentioned formula (4).

[Measurement of Recrystallization Temperature]

Measurement was carried out by holding fine resin particles of resin for a toner once at 10° C. for 5 minutes and heated to 260° C. at 10° C./min heating rate using a differential scanning calorimeter (SSC/5200 DSC220C model, manufactured by Seiko Instruments Inc.). The recrystallization initiating temperature (Tic) and the recrystallization peak temperature (Tpc) were read from the heat generation peak attributed to the recrystallization and the difference of them was calculated.

[Measurement of Change Rate D of Relaxation Modulus]

After melted, each resin composition for a toner was formed into a disk like shape of 25 mm in diameter and 1 mm height to use it as a testing specimen. The specimen was attached to a disk-disk measurement tool and using a relaxation modulus measurement apparatus (RMS-800, manufactured by Rheometric Scientific Inc.), 5% initial shear strain was applied to the specimen at 190° C. and the relaxation modulus $G_{5\%}(0.1)$ after 0.1 second from shear strain application and the relaxation modulus at the peak point of the relaxation modulus curve were measured and the slope of the relaxation modulus curve was calculated according to the above-mentioned equation (1).

[Measurement of Relaxation Modulus and Slope of the Relaxation Modulus Curve]

After melted, each resin composition for a toner was formed into a disk like shape of 1 mm height to use it as a testing specimen. The specimen was attached to a disk-disk measurement tool and using a relaxation modulus measurement apparatus (RMS-800, manufactured by Rheometric Scientific Inc.), 450% initial shear strain was applied to the specimen at 190° C. and the relaxation modulus was measured after 0.02 and 0.1 second from shear strain application and the slope of the relaxation modulus curve was calculated according to the above-mentioned equation (2).

[Evaluation of Blocking]

Each toner 10 g was put in a sampling bottle of 100 mL capacity and left in a thermostat at 50° C. for 8 hours and then sieved with a 250 μm mesh filter to observe whether coagulated matters remained on the filter or not by using a powder tester (HOSOKAWAMICRON CORPORATION) and if there were coagulated matters, the weight (% by weight) of the coagulated matters in the total toner weight was calculated.

[Evaluation of Filming]

Printing was carried out on 10,000 sheets and whether toner adhered to a fixing roller or not was observed with eyes and in the case no toner adhesion was observed, it was evaluated as no filming.

[Gloss Evaluation]

Using a gloss meter (a gloss meter, UGV-50, manufactured by Suga Test Instruments Co., Ltd.), test paper to which each toner was applied to be black was attached to the gloss meter and an optical path was set so as to adjust the reflection angle to be 75 degree to measure the glossiness.

[Measurement of High Temperature Offset Temperature and Low Temperature Offset Temperature]

Each toner 6.5 parts by weight was mixed with an iron powder carrier with an average particle diameter of 60 μm 93.5 parts by weight to obtain a developer. As an electrophotographic copying machine, KM-4230 manufactured by KYOCERA MITA CORPORATION modified so as to change the set temperature of a thermal fixing roller to 220° C. at maximum was used.

The set temperature of the thermal fixing roller was changed step by step and the un-fixed toner image was fixed on transfer paper by the thermal fixing roller at each set temperature to obtain copied printing matters.

Whether the margin part and the fixed image in the obtained printed matters were stained with the toner or not was observed and the temperature range in which no stain was formed was defined as the non-offset temperature range. The highest value in the non-offset temperature range was defined as the high temperature offset temperature and the lowest value was defined as the low temperature offset temperature.

[Measurement of Lowest Fixation Temperature of Toner]

Copying was carried out while the set temperature of the thermal fixing roller of an electrophotographic copying apparatus being changed step by step and it was judged that fixation was well done in the case neither fogging nor staining with the toner was caused in the margin part and the fixed image and the density decrease of the fixed image was less than 10% when the fixed image of the copy was rubbed with an eraser rubber for a type writer and the lowest temperature in such a case was measured.

The image density was measured by using a Macbeth photometer.

[Evaluation of Color Reproducibility]

The fixed image was observed with eyes and evaluated according to the following standard. The image density was measured by using a Macbeth photometer.

E: completely free from fogging and unevenness and the image density was so sufficiently high as 1.6 or higher and image was excellent in resolution degree, transferring property, and gradation property:

G: free from fogging and unevenness and the image density was as high as 1.4 to 1.6 and image was good in resolution degree, transferring property, and gradation property:

F; fogging and unevenness sometimes occurred and the image density was sometimes less than 1.4 and insufficient, however images possible for fixation evaluation were obtained: and D: fogging and unevenness occurred and no satisfactory image was obtained.

TABLE 1

| | | | Example 1 | Example 2 | Example 3 | Example 4 |
|---|---|---|---|---|---|---|
| Crystalline polyester | Raw material monomer (mol) | Terephthalic acid | 100 | 100 | 100 | 100 |
| | | Isophthalic acid | — | — | — | — |
| | | Ethylene glycol | — | — | — | 120 |
| | | 1,4-butanediol | 120 | 120 | 120 | — |
| | Evaluation | Melting point (° C.) | 227 | 227 | 227 | 257 |
| | | Heat absorption (mJ/mg) | 71.6 | 71.6 | 71.6 | 35.9 |
| | | Weight average molecular weight | 80000 | 80000 | 80000 | 75000 |
| Non-crystalline polyester | Raw material monomer (mol) | Terephthalic acid | 90 | 90 | 90 | 90 |
| | | Isophthalic acid | 5 | 5 | 5 | 5 |
| | | Phthalic anhydride | 5 | 5 | 5 | 5 |
| | | Trimellitic acid | — | — | — | — |
| | | Neopentyl glycol | 60 | 60 | 60 | 60 |
| | | Ethylene glycol | 60 | 60 | 60 | 60 |
| | | Bisphenol A ethylene oxide adduct | — | — | — | — |
| | Evaluation | Glass transition temperature (° C.) | 61 | 61 | 61 | 61 |
| | | Weight average molecular weight | 14000 | 14000 | 14000 | 14000 |
| Resin mixing for a toner (part by weight) | | Crystalline polyester | 7 | 10 | 15 | 25 |
| | | Non-crystalline polyester | 93 | 90 | 85 | 75 |
| | | Carnauba wax | 1 | 1 | 1 | 1 |
| Evaluation | Evaluation of resin composition for a toner | Acid value of resin | 0.2 | 0.2 | 0.2 | 0.2 |
| | | Color tone of resin | Colorless and transparent | Colorless and transparent | Colorless and transparent | Colorless and transparent |
| | | Heat absorption of resin (mJ/mg) | 5.2 | 6.6 | 8.8 | 8.9 |
| | | Average particle diameter of crystal particles (μm) | 1.3 | 2.1 | 1.5 | 1.8 |
| | | Haze value (%) | 65.2 | 70.6 | 79.3 | 85.3 |
| | | Recrystallization initiating temperature (Tic) (° C.) | 104 | 103 | 95 | 85 |
| | | Recrystallization peak temperature (Tpc) (° C.) | 127 | 120 | 118 | 108 |
| | | Tpc − Tic (° C.) | 23 | 17 | 23 | 22 |
| | | Relaxation modulus $G_{5\%}(0.1)$ (Pa) | $8.27 \times 10^4$ | $1.57 \times 10^5$ | $2.82 \times 10^5$ | $4.09 \times 10^5$ |
| | | Relaxation modulus $G_{5\%max}$ (Pa) | $1.11 \times 10^5$ | $2.05 \times 10^5$ | $3.63 \times 10^5$ | $5.20 \times 10^5$ |
| | | Change rate D of relaxation modulus | 25.5 | 23.4 | 22.3 | 21.7 |
| | | Relaxation modulus (0.02) (Pa) | $1.47 \times 10^4$ | $3.03 \times 10^4$ | $4.55 \times 10^4$ | $6.47 \times 10^4$ |
| | | Relaxation modulus (0.1) (Pa) | $4.90 \times 10^2$ | $1.16 \times 10^3$ | $1.77 \times 10^3$ | $2.58 \times 10^3$ |
| | | Slope K of relaxation modulus curve | −18.5 | −17.7 | −17.6 | −17.5 |

TABLE 1-continued

|  |  | Example 1 | Example 2 | Example 3 | Example 4 |
|---|---|---|---|---|---|
| Evaluation of toner | Blocking (% by weight) | 0.5 | 0.5 | 0.5 | 0.5 |
|  | Filming evaluation | None | None | None | None |
|  | Gloss evaluation | 39 | 38 | 37 | 37 |
|  | High temperature offset temperature (° C.) | 190 | 205 | 220 or higher | 220 or higher |
|  | Low temperature offset temperature (° C.) | 115 | 120 | 125 | 135 |
|  | Lowest fixation temperature (° C.) | 120 | 125 | 130 | 140 |
|  | Color reproducibility | G | G | G | G |

TABLE 2

|  |  |  | Comparative Example 1 | Comparative Example 2 | Comparative Example 3 | Comparative Example 4 |
|---|---|---|---|---|---|---|
| Crystalline polyester | Raw material monomer (mol) | Terephthalic acid | 60 | 60 | — | — |
|  |  | Isophthalic acid | 40 | 40 | — | — |
|  |  | Ethylene glycol | — | — | — | — |
|  |  | 1,4-butanediol | 120 | 120 | — | — |
|  | Evaluation | Melting point (° C.) | 152 | 153 | — | — |
|  |  | Heat absorption (mJ/mg) | 0.0 | 0.0 | — | — |
|  |  | Weight average molecular weight | 45000 | 80000 | — | — |
| Non-crystalline polyester | Raw material monomer (mol) | Terephthalic acid | 90 | 90 | 90 | 95 |
|  |  | Isophthalic acid | 5 | 5 | 5 | — |
|  |  | Phthalic anhydride | 5 | 5 | 5 | — |
|  |  | Trimellitic acid | — | — | — | 5 |
|  |  | Neopentyl glycol | 60 | 60 | 60 | — |
|  |  | Ethylene glycol | 60 | 60 | 60 | — |
|  |  | Bisphenol A ethylene oxide adduct | — | — | — | 105 |
|  | Evaluation | Glass transition temperature (° C.) | 61 | 61 | 61 | 59 |
|  |  | Weight average molecular weight | 14000 | 14000 | 14000 | 950000 |
| Resin mixing for a toner (part by weight) |  | Crystalline polyester | 20 | 20 | 0 | 0 |
|  |  | Non-crystalline polyester | 80 | 80 | 100 | 100 |
|  |  | Carnauba wax | 1 | 1 | 1 | 1 |
| Evaluation | Evaluation of resin composition for a toner | Acid value of resin | 0.2 | 0.2 | 0.2 | 0.2 |
|  |  | Color tone of resin | Colorless and transparent | Colorless and transparent | Colorless and transparent | Yellow |
|  |  | Heat absorption of resin (mJ/mg) | 0.0 | 0.0 | 0.0 | 0.0 |
|  |  | Average particle diameter of crystal particles (μm) | Not observed | Not observed | — | — |
|  |  | Haze value (%) | 48.3 | 49.1 | 20.6 | 52.7 |
|  |  | Recrystallization initiating temperature (Tic) (° C.) | — | — | — | — |
|  |  | Recrystallization peak temperature (Tpc) (° C.) | — | — | — | — |
|  |  | Tpc − Tic (° C.) | — | — | — | — |
|  |  | Relaxation modulus $G_{5\%}(0.1)$ (Pa) | — | — | $2.23 \times 10$ | $4.08 \times 10^2$ |
|  |  | Relaxation modulus $G_{5\%max}$ (Pa) | — | — | $9.57 \times 10^2$ | $4.81 \times 10^3$ |
|  |  | Change rate D of relaxation modulus | — | — | 97.7 | 91.5 |
|  |  | Relaxation modulus (0.02) (Pa) | $4.08 \times 10^3$ | $4.76 \times 10^3$ | $4.39 \times 10^2$ | $4.40 \times 10^3$ |
|  |  | Relaxation modulus (0.1) (Pa) | $4.52 \times 10$ | $7.33 \times 10$ | 2.07 | $5.33 \times 10^3$ |
|  |  | Slope K of relaxation modulus curve | −24.4 | −22.7 | −29.1 | −10.5 |
|  | Evaluation of toner | Blocking (% by weight) | 2 | 0.5 | 7 | 5 |
|  |  | Filming evaluation | Slight | Slight | Considerable | Slight |
|  |  | Gloss evaluation | 37 | 37 | 37 | 9 |
|  |  | High temperature offset temperature (° C.) | No fixation range | 145 | No fixation range | 175 |
|  |  | Low temperature offset temperature (° C.) | No fixation range | 130 | No fixation range | 140 |
|  |  | Lowest fixation temperature (° C.) | No fixation range | 140 | No fixation range | 145 |
|  |  | Color reproducibility | D | F | D | F |

EXAMPLE 5

(1) Production of Polyamide (Polyamide Ester Copolymer)

A distillation tower, a water separation apparatus, a nitrogen gas introduction pipe, a thermometer, and a stirring apparatus were installed in a reaction container of 60 L capacity according to a common method and under nitrogen gas atmosphere, terephthalic acid 95 mole as a dicarboxylic acid component, isophthalic acid 5 mole as a bending monomer component, neopentylene glycol 70 mole as a branched monomer component, ethylene glycol 50 mole as another diol, 6-nylon (T-850; manufactured by TOYOBO CO., LTD.) in an amount theoretically equivalent to 60% by weight of produced polyester amide, and titanium tetrabutoxide (TBB) 0.05 mole as an esterification condensation catalyst were fed to the container and esterification was carried out at 200° C. while produced water and methanol were taken out of the distillation tower. When discharge of water and methanol out of the distillation tower was stopped, the esterification reaction was finished.

On completion of the esterification reaction, the opening of the reaction container of 60 L capacity to the distillation tower was closed and at the same time the line from a vacuum pump was opened to reduce the pressure of the reaction system to 5 mmHg or lower and condensation reaction was carried out at 240° C. and 60 rpm stirring speed and simultaneously free diol generated by the condensation reaction was discharged out of the reaction system to obtain polyamide ester.

(2) Production of Non-crystalline Polyester (A) (for Blending)

A distillation tower, a water separation apparatus, a nitrogen gas introduction pipe, a thermometer, and a stirring apparatus were installed in a reaction container of 60 L capacity according to a common method and under nitrogen gas atmosphere, terephthalic acid 90 mole as a dicarboxylic acid component, isophthalic acid 5 mole and phthalic anhydride 5 mole as bending monomer components, neopentylene glycol 60 mole as a branched monomer component, ethylene glycol 60 mole as another diol, and titanium tetrabutoxide (TBB) 0.05 mole as an esterification condensation catalyst were fed to the container and esterification was carried out at 200° C. while produced water and methanol were taken out of the distillation tower. When discharge of water and methanol out of the distillation tower was stopped, the esterification reaction was finished.

On completion of the esterification reaction, the opening of the reaction container of 60 L capacity to the distillation tower was closed and at the same time the line from a vacuum pump was opened to reduce the pressure of the reaction system to 5 mmHg or lower and condensation reaction was carried out at 240° C. and 60 rpm stirring speed and simultaneously free diol generated by the condensation reaction was discharged out of the reaction system to obtain non-crystalline polyester (A).

(3) Production of Resin Composition for Toner and of Toner

The obtained polyamide ester copolymer 10 part by weight and the non-crystalline polyester (A) 90 part by weight were melted and kneaded to obtain a resin composition for a toner.

The obtained resin composition for a toner 100 part by weight was mixed with a charge controller (BONTRON S-34; manufactured by Orient Chemical Industries, Ltd.) 1 part by weight, carbon black 5 part by weight, and carnauba wax 1 part by weight and sufficiently stirred by a Henshel type mixer and then the mixture was melted and kneaded at 130° C., cooled and roughly crushed. After that, the mixture was finely crushed by a jet mill (LABO JET; manufactured by Nippon Pneumatic Mfg. Co., Ltd.) to obtain a toner powder with an average particle diameter of about 8 μm. Further, the toner powder was classified by a classifying apparatus (MDS-2; manufactured by Nippon Pneumatic Mfg. Co., Ltd.) to obtain a toner fine powder with an average particle diameter of 10 μm. The obtained toner fine powder 100 part by weight was mixed evenly with hydrophobic silica (R972: NIPPON AEROSIL CO., LTD.) 1.0 part by weight (extrapolation) to obtain a toner.

EXAMPLE 6

(1) Production of Crystalline Polyester

A distillation tower, a water separation apparatus, a nitrogen gas introduction pipe, a thermometer, and a stirring apparatus were installed in a reaction container of 60 L capacity according to a common method and under nitrogen gas atmosphere, terephthalic acid 100 mole as a dicarboxylic acid component, 1,4-butanediol 120 mole as a diol component, and titanium tetrabutoxide (TBB) 0.05 mole as an esterification condensation catalyst were fed to the container and esterification was carried out at 220° C. while produced water and methanol were taken out of the distillation tower. When discharge of water and methanol out of the distillation tower was stopped, the esterification reaction was finished.

On completion of the esterification reaction, the opening of the reaction container of 60 L capacity to the distillation tower was closed and at the same time the line from a vacuum pump was opened to reduce the pressure of the reaction system to 5 mmHg or lower and condensation reaction was carried out at 240° C. and 60 rpm stirring speed and simultaneously free diol generated by the condensation reaction was discharged out of the reaction system to obtain a high melting point crystalline polyester.

(2) Production of Non-crystalline Polyester (A) (for Blending)

A distillation tower, a water separation apparatus, a nitrogen gas introduction pipe, a thermometer, and a stirring apparatus were installed in a reaction container of 60 L capacity according to a common method and under nitrogen gas atmosphere, terephthalic acid 90 mole as a dicarboxylic acid component, isophthalic acid 5 mole and phthalic anhydride 5 mole as bending monomer components, neopentylene glycol 60 mole as a branched monomer component, ethylene glycol 60 mole as another diol, and titanium tetrabutoxide (TBB) 0.05 mole as an esterification condensation catalyst were fed to the container and esterification was carried out at 200° C. while produced water and methanol were taken out of the distillation tower. When discharge of water and methanol out of the distillation tower was stopped, the esterification reaction was finished.

On completion of the esterification reaction, the opening of the reaction container of 60 L capacity to the distillation tower was closed and at the same time the line from a vacuum pump was opened to reduce the pressure of the reaction system to 5 mmHg or lower and condensation reaction was carried out at 240° C. and 60 rpm stirring speed and simultaneously free diol generated by the condensation reaction was discharged out of the reaction system to obtain non-crystalline polyester (A).

(3) Production of Non-crystalline Polyester (B) (for Blending)

A distillation tower, a water separation apparatus, a nitrogen gas introduction pipe, a thermometer, and a stirring apparatus were installed in a reaction container of 60 L capacity according to a common method and under nitrogen gas atmosphere, terephthalic acid 90 mole as a dicarboxylic acid component, isophthalic acid 10 mole as a bending monomer component, neopentylene glycol 60 mole as a branched monomer component, ethylene glycol 60 mole as another diol, and titanium tetrabutoxide (TBB) 0.05 mole as an esterification condensation catalyst were fed to the container and esterification was carried out at 200° C. while produced water and methanol were taken out of the distillation tower. When discharge of water and methanol out of the distillation tower was stopped, the esterification reaction was finished.

On completion of the esterification reaction, the opening of the reaction container of 60 L capacity to the distillation tower was closed and at the same time the line from a vacuum pump was opened to reduce the pressure of the reaction system to 5 mmHg or lower and condensation reaction was carried out at 240° C. and 60 rpm stirring speed and simultaneously free diol generated by the condensation reaction was discharged out of the reaction system to obtain non-crystalline polyester (B).

(4) Production of Resin Composition for Toner and of Toner

The obtained high melting point crystalline polyester 10 parts by weight, non-crystalline polyester (A) 80 parts by weight, and non-crystalline polyester (B) 20 parts by weight were melted and kneaded to obtain a resin composition for a toner.

The obtained resin composition for a toner 100 parts by weight was mixed with a charge controller (BONTRON S-34; manufactured by Orient Chemical Industries, Ltd.) 1 part by weight, carbon black 5 parts by weight, and carnauba wax 1 part by weight and sufficiently stirred by a Henshel type mixer and then the mixture was melted and kneaded at 130° C., cooled and roughly crushed. After that, the mixture was finely crushed by a jet mill (LABO JET; manufactured by Nippon Pneumatic Mfg. Co., Ltd.) to obtain a toner powder with an average particle diameter of about 8 μm. Further, the toner powder was classified by a classifying apparatus (MDS-2; manufactured by Nippon Pneumatic Mfg. Co., Ltd.) to obtain a toner fine powder with an average particle diameter of 10 μm. The obtained toner fine powder 100 parts by weight was mixed evenly with hydrophobic silica (R972: NIPPON AEROSIL CO., LTD.) 1.0 part by weight (extrapolation) to obtain a toner.

EXAMPLE 7

A resin composition for a toner and a toner were obtained in the same manner as Example 6, except that the addition amount of the crystalline polyester was changed to 30 parts by weight in production of the resin composition for a toner.

COMPARATIVE EXAMPLE 5

A distillation tower, a water separation apparatus, a nitrogen gas introduction pipe, a thermometer, and a stirring apparatus were installed in a reaction container of 60 L capacity according to a common method and under nitrogen gas atmosphere, terephthalic acid 99 mole and trimellitic acid 1 mole as dicarboxylic acid components, bisphenol A propylene oxide adduct 105 mole as a diol component, and dibutyl tin oxide 0.05 mole as an esterification condensation catalyst were fed to the container and esterification was carried out at 200° C. while produced water and methanol were taken out of the distillation tower. When discharge of water and methanol out of the distillation tower was stopped, the esterification reaction was finished.

On completion of the esterification reaction, the opening of the reaction container of 60 L capacity to the distillation tower was closed and at the same time the line from a vacuum pump was opened to reduce the pressure of the reaction system to 5 mmHg or lower and condensation reaction was carried out at 240° C. and 60 rpm stirring speed and simultaneously free diol generated by the condensation reaction was discharged out of the reaction system to obtain a non-crystalline polyester.

A toner was produced in the same manner as Example 5, except only the obtained non-crystalline polyester was used for resin for a toner.

The resin compositions for a toner and toners produced in Examples 5 to 7 and Comparative Example 5 were evaluated in the same manner as described above.

The results are shown in Table 3.

TABLE 3

| | | | Example 5 | Example 6 | Example 7 | Comparative Example 5 |
|---|---|---|---|---|---|---|
| Crystalline polymer | Raw material monomer | Terephthalic acid (mol) | 95 | 100 | 100 | — |
| | | Isophthalic acid (mol) | 5 | — | — | — |
| | | Neopentyl glycol (mol) | 70 | — | — | — |
| | | Ethylene glycol (mol) | 50 | — | — | — |
| | | 1,4-butanediol (mol) | — | 120 | 120 | — |
| | | 6-nylon (% by weight in crystalline polymer) | 60 | — | — | — |
| | Evaluation | Melting point (° C.) | 187 | 227 | 227 | — |
| | | Heat absorption (mJ/mg) | 40.0 | 53.6 | 53.6 | — |
| | | Weight average molecular weight | 180000 | 20000 | 20000 | — |
| Non-crystalline polyester (A) | Raw material monomer | Terephthalic acid (mol) | 90 | 90 | 90 | 99 |
| | | Isophthalic acid (mol) | 5 | 5 | 5 | — |
| | | Phthalic anhydride (mol) | 5 | 5 | 5 | — |
| | | Neopentyl glycol (mol) | 60 | 60 | 60 | — |
| | | Ethylene glycol (mol) | 60 | 60 | 60 | — |
| | | Bisphenol A propylene oxide adduct(mol) | — | — | — | 105 |
| | | Trimellitic acid(mol) | — | — | — | 1 |
| | Evaluation | Glass transition temperature (° C.) | 60 | 56.5 | 56.5 | 58 |
| | | Weight average molecular weight | 15000 | 11000 | 11000 | 250000 |
| Non-crystalline polyester | Raw material monomer | Terephthalic acid (mol) | — | 90 | 90 | — |
| | | Isophthalic acid (mol) | — | 10 | 10 | — |
| | | Neopentyl glycol (mol) | — | 60 | 60 | — |

TABLE 3-continued

|  |  |  | Example 5 | Example 6 | Example 7 | Comparative Example 5 |
|---|---|---|---|---|---|---|
| (B) |  | Ethylene glycol (mol) | — | 60 | 60 | — |
|  |  | Trimellitic acid (mol) | — | — | — | — |
|  | Evaluation | Glass transition temperature (° C.) | — | 67 | 67 | — |
|  |  | Weight average molecular weight | — | 120000 | 120000 | — |
| Resin mixing for a toner (part by weight) |  | Crystalline polyester | — | 10 | 30 | — |
|  |  | Crystalline polyamide | 10 | — | — | — |
|  |  | Non-crystalline polyester (A) | 90 | 70 | 70 | 100 |
|  |  | Non-crystalline polyester (B) | — | 30 | 30 | — |
| Wax |  | carnauba wax (melting point 82° C.) (part by weight) | 1 | 1 | 1 | — |
| Evaluation | Evaluation of resin composition for a toner | Acid value of resin | 0.2 | 0.2 | 0.2 | 0.2 |
|  |  | Color tone of resin | Colorless and semitransparent | Colorless and transparent | Colorless and transparent | Pale yellow and semitransparent |
|  |  | Heat absorption of resin (mJ/mg) | 3.7 | 4.8 | 12.4 | 0.0 |
|  |  | Average particle diameter of crystal particles (μm) | — | — | — | — |
|  |  | Haze value (%) | — | — | — | — |
|  |  | Recrystallization initiating temperature (Tic) (° C.) | — | — | — | — |
|  |  | Recrystallization peak temperature (Tpc) (° C.) | — | — | — | — |
|  |  | Tpc − Tic (° C.) | — | — | — | — |
|  |  | Relaxation modulus $G_{5\%}(0.1)$ (Pa) | — | $1.77 \times 10^5$ | $6.77 \times 10^5$ | — |
|  |  | Relaxation modulus $G_{5\% \, max}$ (Pa) | — | $2.41 \times 10^5$ | $8.71 \times 10^5$ | — |
|  |  | Change rate D of relaxation modulus | — | 26.6 | 22.3 | — |
|  |  | Relaxation modulus (0.02) (Pa) | $7.97 \times 10^3$ | $2.01 \times 10^4$ | $4.55 \times 10^4$ | $5.28 \times 10^3$ |
|  |  | Relaxation modulus (0.1) (Pa) | $2.07 \times 10^2$ | $7.15 \times 10^2$ | $1.77 \times 10^2$ | $9.51 \times 10$ |
|  |  | Slope K of relaxation modulus curve | −19.8 | −18.1 | −17.6 | −21.8 |
|  | Evaluation of toner | Blocking (% by weight) | 0.5 | 1.0 | 0.5 | 9 |
|  |  | Filming evaluation | None | None | None | Extremely slight |
|  |  | Gloss evaluation | 29 | 32 | 37 | 1 |
|  |  | High temperature offset temperature (° C.) | 190 | 200 | 220 or higher | 160 |
|  |  | Low temperature offset temperature (° C.) | 120 | 115 | 135 | 135 |
|  |  | Lowest fixation temperature (° C.) | 125 | 120 | 140 | 140 |
|  |  | Color reproducibility | G | G | G | F |

EXAMPLES 8 TO 10

Resin compositions for a toner and toners were obtained and evaluated in the same manner as Example 1, except that crystalline polyesters and non-crystalline polyesters were produced using raw material monomers shown in Table 4 and they were used for the resin compositions and toners.

Results are shown in Table 4.

TABLE 4

|  |  |  | Example 8 | Example 9 | Example 10 |
|---|---|---|---|---|---|
| Crystalline polyester | Raw material monomer | Terephthalic acid (mol) | 100 | 100 | 100 |
|  |  | Isophthalic acid (mol) | — | — | — |
|  |  | Ethylene glycol (mol) | — | — | — |
|  |  | 1,4-butanediol (mol) | 120 | 120 | 120 |
|  | Evaluation | Melting point (° C.) | 227 | 228 | 227 |
|  |  | Heat absorption (mJ/mg) | 58.0 | 89.6 | 73.1 |
|  |  | Weight average molecular weight | 35000 | 140000 | 85000 |
| Non-crystalline polyester | Raw material monomer | Terephthalic acid (mol) | 90 | 90 | 90 |
|  |  | Isophthalic acid (mol) | 5 | 10 | — |
|  |  | Phthalic anhydride (mol) | 5 | — | 4.5 |
|  |  | Trimellitic acid (mol) | — | — | 0.5 |
|  |  | Neopentyl glycol (mol) | 60 | 50 | 50 |
|  |  | Ethylene glycol (mol) | 60 | 50 | 50 |
|  |  | Bisphenol A ethylene oxide adduct (mol) | — | — | — |
|  | Evaluation | Glass transition temperature (° C.) | 61 | 61.5 | 57.5 |
|  |  | Weight average molecular weight | 14000 | 14000 | 9000 |
| Resin mixing for a toner (part by weight) |  | Crystalline polyester | 7 | 7 | 10 |
|  |  | Non-crystalline polyester | 93 | 93 | 90 |
|  |  | Carnauba wax (part by weight) | 1 | 1 | 1 |

TABLE 4-continued

|  |  |  | Example 8 | Example 9 | Example 10 |
|---|---|---|---|---|---|
| Evaluation | Evaluation of resin composition for a toner | Acid value of resin | 0.2 | 3 | 10 |
|  |  | Color tone of resin | Colorless and transparent | Colorless and transparent | Colorless and transparent |
|  |  | Heat absorption of resin (mJ/mg) | 3.9 | 6.3 | 7.3 |
|  |  | Average particle diameter of crystal particles (μm) | — | — | — |
|  |  | Haze value (%) | — | — | — |
|  |  | Recrystallization initiating temperature (Tic) (° C.) | — | — | — |
|  |  | Recrystallization peak temperature (Tpc) (° C.) | — | — | — |
|  |  | Tpc − Tic (° C.) | — | — | — |
|  |  | Relaxation modulus $G_{5\%}(0.1)$ (Pa) | — | — | — |
|  |  | Relaxation modulus $G_{5\%max}$ (Pa) | — | — | — |
|  |  | Change rate D of relaxation modulus | — | — | — |
|  |  | Relaxation modulus (0.02) (Pa) | $7.98 \times 10^3$ | $3.62 \times 10^4$ | $2.03 \times 10^4$ |
|  |  | Relaxation modulus (0.1) (Pa) | $2.08 \times 10^2$ | $1.39 \times 10^3$ | $7.23 \times 10^2$ |
|  |  | Slope K of relaxation modulus curve | −19.8 | −17.7 | −18.1 |
|  | Evaluation of toner | Blocking (% by weight) | 0.5 | 0.5 | 0.5 |
|  |  | Filming evaluation | None | None | None |
|  |  | Gloss evaluation | 39 | 39 | 36 |
|  |  | High temperature offset temperature (° C.) | 180 | 200 | 190 |
|  |  | Low temperature offset temperature (° C.) | 115 | 120 | 115 |
|  |  | Lowest fixation temperature (° C.) | 120 | 125 | 120 |
|  |  | Color reproducibility | G | G | G |

EXAMPLES 11 and COMPARATIVE EXAMPLES

Resin compositions for a toner and toners were obtained and evaluated in the same manner as Example 1, except that crystalline polyesters and non-crystalline polyesters were produced using raw material monomers shown in Table 5 and they were used for the resin compositions and toners.

Results are shown in Table 5.

TABLE 5

|  |  |  | Example 11 | Example |
|---|---|---|---|---|
| Crystalline polyester | Raw material monomer | Terephthalic acid (mol) | 100 | — |
|  |  | 2,6-naphthalenedicarboxylic acid (mol) | — | 100 |
|  |  | Ethylene glycol (mol) | — | — |
|  |  | 1,4-butanediol (mol) | 120 | 120 |
|  | Evaluation | Melting point (° C.) | 227 | 261 |
|  |  | Heat absorption (mJ/mg) | 73.1 | 67.1 |
|  |  | Glass transition temperature (° C.) | 34 | 45 |
|  |  | Weight average molecular weight | 85000 | 65000 |
| Non-crystalline polyester | Raw material monomer | Terephthalic acid (mol) | 90 | 90 |
|  |  | Isophthalic acid (mol) | 5 | 5 |
|  |  | Phthalic anhydride (mol) | 5 | 5 |
|  |  | Trimellitic acid (mol) | — | — |
|  |  | Neopentyl glycol (mol) | 60 | 60 |
|  |  | Ethylene glycol (mol) | 60 | 60 |
|  |  | Bisphenol A ethylene oxide adduct (mol) | — | — |
|  | Evaluation | Glass transition temperature (° C.) | 63 | 63 |
|  |  | Weight average molecular weight | 21000 | 21000 |
| Resin mixing for a toner (part by weight) |  | Crystalline polyester | 25 | 25 |
|  |  | Non-crystalline polyester | 75 | 75 |
|  |  | Carnauba wax (part by weight) | 1 | 1 |
| Evaluation | Evaluation of resin composition for a toner | Glass transition temperature (° C.) | 56 | 62 |
|  |  | Acid value of resin | 0.3 | 0.3 |
|  |  | Color tone of resin | Colorless and transparent | Colorless and transparent |
|  |  | Heat absorption of resin (mJ/mg) | 13.4 | 3.0 |
|  |  | Average particle diameter of crystal particles (μm) | — | — |
|  |  | Haze value (%) | — | — |
|  |  | Recrystallization initiating temperature (Tic) (° C.) | — | — |
|  |  | Recrystallization peak temperature (Tpc) (° C.) | — | — |
|  |  | Tpc − Tic (° C.) | — | — |
|  |  | Relaxation modulus $G_{5\%}(0.1)$ (Pa) | — | — |
|  |  | Relaxation modulus $G_{5\%max}$ (Pa) | — | — |
|  |  | Change rate D of relaxation modulus | — | — |

TABLE 5-continued

|  |  | Example 11 | Example |
|---|---|---|---|
| Evaluation of toner | Relaxation modulus (0.02) (Pa) | $9.55 \times 10^4$ | $1.45 \times 10^5$ |
|  | Relaxation modulus (0.1) (Pa) | $3.86 \times 10^3$ | $3.42 \times 10^2$ |
|  | Slope K of relaxation modulus curve | −17.4 | −32.9 |
|  | Blocking (% by weight) | 0.5 | 0.5 |
|  | Filming evaluation | None | None |
|  | Gloss evaluation | 37 | 11 |
|  | High temperature offset temperature (° C.) | 220 or higher | 180 |
|  | Low temperature offset temperature (° C.) | 140 | 145 |
|  | Lowest fixation temperature (° C.) | 145 | 150 |
|  | Color reproducibility | G | F |

EXAMPLES 13 TO 16

Resin compositions for a toner and toners were obtained and evaluated in the same manner as Example 6, except that crystalline polyesters, non-crystalline polyesters (A) and non-crystalline polyesters (B) were produced using raw material monomers shown in Table 6 and they were used for the resin compositions and toners.

Results are shown in Table 6.

TABLE 6

|  |  |  | Example 13 | Example 14 | Example 15 | Example 16 |
|---|---|---|---|---|---|---|
| Crystalline polymer | Raw material monomer | Terephthalic acid (mol) | 100 | 100 | 100 | 100 |
|  |  | 1,4-butanediol (mol) | 120 | 120 | 120 | 120 |
|  | Evaluation | Melting point (° C.) | 230 | 230 | 230 | 230 |
|  |  | Heat absorption (mJ/mg) | 71.5 | 62.6 | 70.4 | 71.5 |
|  |  | Weight average molecular weight | 82000 | 40000 | 60000 | 82000 |
| Non-crystalline polyester (A) | Raw material monomer | Terephthalic acid (mol) | 90 | 90 | 90 | 90 |
|  |  | Isophthalic acid (mol) | 5 | 5 | 5 | 5 |
|  |  | Phthalic anhydride (mol) | 5 | 5 | 5 | 5 |
|  |  | Neopentyl glycol (mol) | 60 | 60 | — | 60 |
|  |  | Ethylene glycal (mol) | 60 | 60 | — | 60 |
|  |  | Bisphenol A propylene oxide adduct(mol) | — | — | 120 | — |
|  |  | Trimellitic acid(mol) | — | — | 0.5 | — |
|  | Evaluation | Glass transition temperature (° C.) | 50 | 61 | 63 | 50 |
|  |  | Weight average molecular weight | 4700 | 14000 | 35000 | 4700 |
| Non-crystalline polyester (B) | Raw material monomer | Terephthalic acid (mol) | 100 | 90 | 100 | 100 |
|  |  | Isophthalic acid (mol) | — | 10 | — | — |
|  |  | Neopentyl glycol (mol) | — | 60 | 60 | — |
|  |  | Ethylene glycol (mol) | 100 | 60 | 60 | 100 |
|  |  | 1,4-cyclohexane dimethanol(mol) | 20 | — | — | 20 |
|  |  | Trimellitic acid (mol) | — | — | — | 0.5 |
|  | Evaluation | Glass transition temperature (° C.) | 73 | 67 | 69 | 73 |
|  |  | Weight average molecular weight | 51000 | 120000 | 67000 | 71000 |
| Resin mixing for a toner (part by weight) |  | Crystalline polyester | 7.5 | 3 | 7.5 | 7.5 |
|  |  | Non-crystalline polyester (A) | 57.5 | 70 | 67.5 | 67.5 |
|  |  | Non-crystalline polyester (B) | 35 | 27 | 25 | 20 |
| Low melting point compound (part by weight) |  | Aliphatic polyester, melting point 77° C. (Polylite ODX-2555 manufactured by DAINIPPON INK AND CHEMICALS, INC.) | 3 | — | — | — |
|  |  | Rice wax (Melting point 84° C.) | — | 3 | 3 | 3 |
| Evaluation | Evaluation of resin composition for a toner | Content of components with molecular weight of 1,000 to 300,000 in non-crystalline polyesters (% by weight) (Content of components with molecular weight of 1,000 to 20,000(% by weight)) (Content of components with molecular weight of 20,000 to 300,000 (% by weight)) | 93 (68) (32) | 97 (54) (46) | 98 (33) (67) | 92 (75) (25) |
|  |  | Acid value of resin | 4 | 0.2 | 4 | 4 |
|  |  | Color tone of resin | Colorless and semitransparent | Colorless and semitransparent | Colorless and semitransparent | Colorless and semitransparent |
|  |  | Heat absorption of resin (mJ/mg) | 5.5 | 1.8 | 4.9 | 5.7 |
|  |  | Relaxation modulus $G_{5\%}(0.1)$ (Pa) | — | $2.92 \times 10^3$ | — | — |

TABLE 6-continued

|  |  | Example 13 | Example 14 | Example 15 | Example 16 |
|---|---|---|---|---|---|
|  | Relaxation modulus $G_{5\%max}$ (Pa) | — | $2.08 \times 10^4$ | — | — |
|  | Change rate D of relaxation modulus | — | 86.0 | — | — |
|  | Relaxation modulus (0.02) (Pa) | — | $8.31 \times 10^3$ | — | — |
|  | Relaxation modulus (0.1) (Pa) | — | $2.28 \times 10^2$ | — | — |
|  | Slope K of relaxation modulus curve | — | −19.5 | — | — |
| Evaluation of toner | Blocking (% by weight) | 0.5 | 0.5 | 0.5 | 0.5 |
|  | Filming evaluation | None | None | None | None |
|  | Gloss evaluation | 43 | 38 | 35 | 41 |
|  | High temperature offset temperature (° C.) | 220 or higher | 200 | 220 or higher | 220 or higher |
|  | Low temperature offset temperature (° C.) | 115 | 120 | 125 | 105 |
|  | Lowest fixation temperature (° C.) | 120 | 125 | 130 | 110 |
|  | Color reproducibility | E | E | G | E |

INDUSTRIAL APPLICABILITY

According to the invention, a resin composition for a toner and a toner excellent in the low temperature fixation property, the high temperature offset resistance, and the blocking resistance and capable of carrying out good coloration can be provided.

The invention claimed is:

1. A resin composition for a toner,
which contains a crystalline polymer having a melting point of 187 to 280° C. and heat absorption of 25 to 150 mJ/mg at a melting point measured by a differential scanning calorimeter (DSC) and a non-crystalline polyester having a glass transition temperature of 30 to 80° C.,
which, when 450% of a shear strain is applied at 190° C., it has −27 or higher slope K of the relaxation modulus curve observed after 0.02 seconds to 0.1 seconds from the moment of the shear strain application defined by the following formula (2):

$$K=\{Log(G(0.1))-Log(G(0.02))\}/(0.1-0.02) \quad (2)$$

wherein, G(0.02) represents the relaxation modulus after 0.02 seconds from the shear strain application; and G(0.1) represents the relaxation modulus after 0.1 seconds from the shear strain application.

2. The resin composition for a toner according to claim 1, which has heat absorption of 1 to 20 mJ/mg at a melting point measured by a differential scanning calorimeter (DSC).

3. The resin composition for a toner according to claim 1, wherein an average particle diameter of crystalline particles observed by a polarizing microscope is 5 μm or smaller.

4. The resin composition for a toner according to claim 1, which has a haze value of 60% or higher measured by a method according to JIS K 7105.

5. The resin composition for a toner according to claim 1, which has 30° C. or less difference of the recrystallization initiating temperature Tic and the recrystallization peak temperature Tpc measured by a differential scanning calorimeter (DSC).

6. The resin composition for a toner according to claim 5, wherein recrystallization initiating temperature Tic is 80° C. or higher.

7. The resin composition for a toner according to claim 1, which, when 5% shear strain is applied at 190° C., has 15 to 90 change rate D of the relaxation modulus defined by the following formula (1):

$$D=(1-G_{5\%}(0.1)/G_{5\%\,max}) \times 100 \quad (1)$$

in the formula, $G_{5\%}(0.1)$ represents the relaxation modulus after 0.1 second from 5% shear strain application and $G_{5\%\,max}$ represents the relaxation modulus at the peak point of the relaxation modulus curve in a graph showing the time from the shear strain application in the horizontal axis and the relaxation modulus in the vertical axis.

8. The resin composition for a toner according to claim 1, wherein, when 450% shear strain is applied at 190° C., the relaxation modulus G(0.1) is 30 to 3,000 Pa after 0.1 seconds from the shear strain application.

9. The resin composition for a toner according to claim 1, wherein the crystalline polymer has a weight average molecular weight of 30,000 to 300,000.

10. The resin composition for a toner according to claim 1, wherein the crystalline polymer is a crystalline polyester.

11. The resin composition for a toner according to claim 10, wherein the crystalline polyester is polybutylene terephthalate.

12. The resin composition for a toner according to claim 10, wherein the crystalline polyester is polyethylene terephthalate.

13. The resin composition for a toner according to claim 1, wherein the crystalline polymer is a crystalline polyamide.

14. The resin composition for a toner according to claim 1, wherein the crystalline polymer comprises a crystalline polyamide and a crystalline polyester.

15. The resin composition for a toner according to claim 1, wherein the non-crystalline polyester is obtained by polymerization of a monomer mixture mainly containing terephthalic acid and neopentyl glycol as well as ethylene glycol and/or 1,4-butane diol.

16. The resin composition for a toner according to claim 1, wherein the non-crystalline polyester comprises a non-crystalline polyester with a weight average molecular weight of 3,000 to 20,000 and a non-crystalline polyester with a weight average molecular weight of 30,000 to 300,000.

17. The resin composition for a toner according to claim 1, wherein the non-crystalline polyester contains 90% by weight or more of the non-crystalline polyester with a molecular weight of 1,000 to 300,000 and in the non-crystalline polyester with a molecular weight of 1,000 to 300,000, 40 to 90% by weight has a molecular weight of 1,000 to 20,000 and 10 to 60% by weight has a molecular weight of 20,000 to 300,000.

18. The resin composition for a toner according to claim 1, wherein the crystalline polymer and the non-crystalline polyester are compatible with each other.

19. The resin composition for a toner according to claim 1, which has a glass transition temperatures C (° C.) satisfying the following formula (3) in relation to the glass transition temperature A (° C.) of the crystalline polymer and the glass transition temperature B (° C.) of the non-crystalline polyester:

$$sA+tB-2 \leq C \leq sA+tB+2 \quad (3)$$

in the formula (3), the reference character s represents the weight ratio of the crystalline polymer in the resin composition for a toner and the reference character t represents the weight ratio of the non-crystalline polyester in the resin composition for a toner.

20. The resin composition for a toner according to claim 1, which has an acid value of 1 to 30.

21. A toner comprising the resin composition for a toner according to claim 1.

22. The toner according to claim 21, which contains a low melting point compound having a melting point of 70 to 120 °C.

23. The toner according to claim 22, wherein the low melting point compound is a crystalline polyester.

24. The toner according to claim 22, wherein the low melting point compound is a wax.

* * * * *